US012093465B2

(12) United States Patent
Lu et al.

(10) Patent No.: US 12,093,465 B2
(45) Date of Patent: Sep. 17, 2024

(54) METHODS AND SYSTEMS FOR HAND GESTURE-BASED CONTROL OF A DEVICE

(71) Applicant: HUAWEI TECHNOLOGIES CO., LTD., Guangdong (CN)

(72) Inventors: Juwei Lu, North York (CA); Sayem Mohammad Siam, North York (CA); Wei Zhou, Richmond Hill (CA); Peng Dai, Markham (CA); Xiaofei Wu, Guodong (CN); Songcen Xu, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/950,246

(22) Filed: Sep. 22, 2022

(65) Prior Publication Data

US 2023/0082789 A1 Mar. 16, 2023

Related U.S. Application Data

(63) Continuation of application No. PCT/CN2020/080562, filed on Mar. 23, 2020.

(51) Int. Cl.
*G06F 3/01* (2006.01)
*G06V 40/20* (2022.01)

(52) U.S. Cl.
CPC .............. *G06F 3/017* (2013.01); *G06V 40/20* (2022.01)

(58) Field of Classification Search
CPC ......... G06F 3/017; G06F 3/012; G06V 40/20; G06V 10/141; G06V 10/25; G06V 10/82; G06V 40/107; G06V 40/161; G06V 40/172; G06V 40/28; G06N 3/045; G06N 3/048; H04N 21/4223; H04N 21/44218
See application file for complete search history.

(56) References Cited

U.S. PATENT DOCUMENTS 6,677,969 B1  1/2004  Hongo
9,465,444 B1  10/2016  Ramaswamy
(Continued)

FOREIGN PATENT DOCUMENTS

CN  102713794 A  10/2012
CN  104011631 A  8/2014
(Continued)

OTHER PUBLICATIONS

Juwei Lu, Sayem Mohammad Siam, Wei Zhou, Peng Dai, Wu Xiaofei, Xu Songcen, "A Novel Hand Gesture Recognition System," Huawei invention ID: 86669168.
(Continued)

*Primary Examiner* — Grant Sitta

(57) ABSTRACT

Methods and systems for gesture-based control of a device are described. An input frame is processed to determine a location of a distinguishing anatomical feature in the input frame. A virtual gesture-space is defined based on the location of the distinguishing anatomical feature, the virtual gesture-space being a defined space for detecting a gesture input. The input frame is processed in only the virtual gesture-space, to detect and track a hand. Using information generated from detecting and tracking the at least one hand, a gesture class is determined for the at least one hand. The device may be a smart television, a smart phone, a tablet, etc.

20 Claims, 21 Drawing Sheets

(56) References Cited

U.S. PATENT DOCUMENTS

| | | | |
|---|---|---|---|
| 9,785,247 B1* | 10/2017 | Horowitz | G06F 3/0304 |
| 10,528,145 B1* | 1/2020 | Zhang | G06F 3/04815 |
| 11,495,034 B2* | 11/2022 | Oh | G06F 3/017 |
| 2011/0304541 A1 | 12/2011 | Dalal | |
| 2012/0236180 A1 | 9/2012 | Lin | |
| 2012/0268372 A1 | 10/2012 | Park et al. | |
| 2012/0275648 A1 | 11/2012 | Guan | |
| 2013/0120243 A1 | 5/2013 | Kim et al. | |
| 2013/0201104 A1* | 8/2013 | Ptucha | G06F 3/017 345/158 |
| 2013/0265448 A1* | 10/2013 | Li | H04N 21/41265 348/207.1 |
| 2014/0037134 A1* | 2/2014 | Tong | G06V 40/161 382/103 |
| 2014/0055566 A1* | 2/2014 | Hsu | G06V 10/143 348/46 |
| 2014/0147035 A1* | 5/2014 | Ding | G06V 40/161 382/164 |
| 2014/0307955 A1* | 10/2014 | Liu | G06V 40/10 382/154 |
| 2014/0351753 A1 | 11/2014 | Shin et al. | |
| 2015/0379332 A1* | 12/2015 | Matsunaga | G06V 40/172 348/77 |
| 2016/0078289 A1* | 3/2016 | Michel | G06T 7/73 345/156 |
| 2016/0195926 A1 | 7/2016 | Imoto et al. | |
| 2017/0139487 A1* | 5/2017 | Kimura | G06T 7/70 |
| 2018/0095525 A1* | 4/2018 | Nabwani | G06F 3/017 |
| 2019/0050664 A1 | 2/2019 | Yang et al. | |
| 2019/0057246 A1 | 2/2019 | Li | |
| 2021/0110190 A1 | 4/2021 | Park et al. | |
| 2021/0191526 A1* | 6/2021 | Heo | G06V 40/172 |
| 2023/0108331 A1* | 4/2023 | Wu | G06V 10/25 345/156 |

FOREIGN PATENT DOCUMENTS

| | | |
|---|---|---|
| CN | 106383452 A | 2/2017 |
| CN | 107491755 A | 12/2017 |
| CN | 108108024 A | 6/2018 |
| CN | 108460329 A | 8/2018 |
| EP | 2400371 A2 | 12/2011 |
| JP | 2011039844 A | 2/2011 |
| JP | 2011078009 A | 4/2011 |
| JP | 2011086052 A | 4/2011 |
| JP | 2012515968 A | 7/2012 |
| JP | 2013257762 A | 12/2013 |
| JP | 2014048937 A | 3/2014 |
| JP | 2014215634 A | 11/2014 |
| JP | 2017211739 A | 11/2017 |
| JP | 2018085087 A | 5/2018 |
| JP | 2018147054 A | 9/2018 |
| WO | 2010085221 A1 | 7/2010 |
| WO | 2018235198 A1 | 12/2018 |
| WO | 2019023921 A1 | 2/2019 |

OTHER PUBLICATIONS

Ali Ghobadzadeh, Juwei Lu, and Wei Li, "Adaptive Face Cropping for face recognition", Huawei invention ID: 86106689, filed in Mar. 19, 2019.

He, Kaiming, et al. "Deep residual learning for image recognition." Proceedings of the IEEE conference on computer vision and pattern recognition. 2016.

Redmon, Joseph, and Ali Farhadi. "Yolov3: An incremental improvement." arXiv preprint arXiv:1804.02767, 2018.

Sandler, Mark, et al. "Mobilenetv2: Inverted residuals and linear bottlenecks." Proceedings of the IEEE Conference on Computer Vision and Pattern Recognition. 2018.

Liu, Wei, et al. "Ssd: Single shot multibox detector." European conference on computer vision. Springer, Cham, 2016.

B. D. Lucas and T. Kanade, An iterative image registration technique with an application to stereo vision. Proceedings of Imaging Understanding Workshop, 1981.

Howard, Andrew G., et al. "Mobilenets: Efficient convolutional neural networks for mobile vision applications." arXiv preprint arXiv:1704.04861, 2017.

Zhaohua Hu et al., Deep Ensemble Object Tracking Based on Temporal and Spatial Networks, IEEE Access, U.S.A., IEEE, Jan. 6, 2020, vol. 8, pp. 7490-7505.

Yuya Imamura, A method to operate home appliances using a command space fixed around an operator, The Papers of Technical Meeting, IEEE Japan, Japan, The Institute of Electrical Engineers of Japan, Apr. 26, 2013, PI-13-12, p. 23-26.

Sarang Suresh Kakkoth, Visual descriptors based Real Time Hand Gesture Recognition, 2018 International Conference on Advances in Communication and Computing Technology (ICACCT), ID, IEEE, Feb. 8, 2018, p. 361-367.

Sonorous rose, Hand Pose Regression via a Classification-guided Approach, Published on Aug. 3, 2019, URL: Published on Aug. 3, 2019, with the English abstract, 10 pages.

* cited by examiner

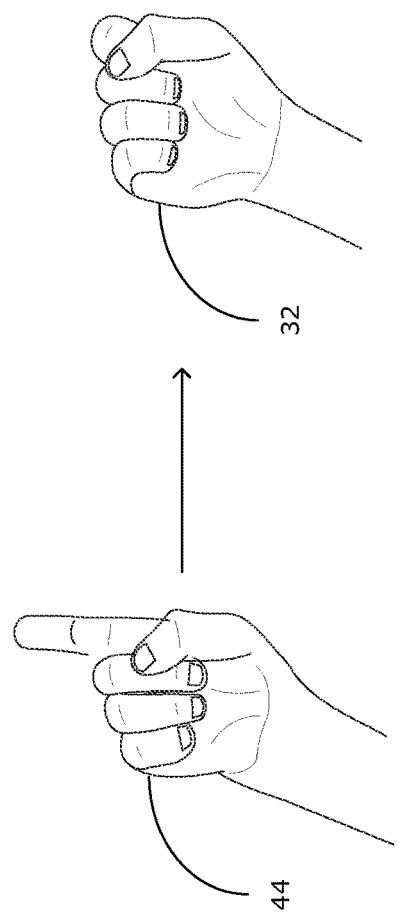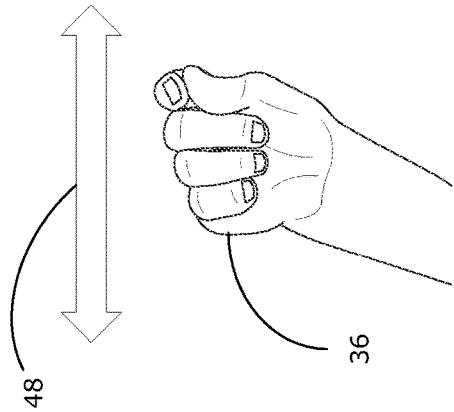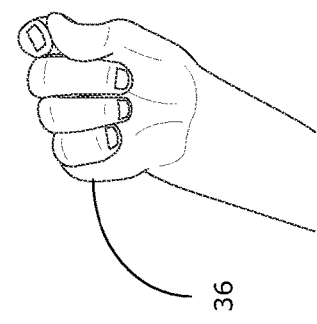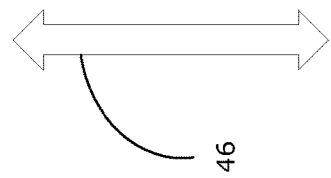
FIG. 4A
FIG. 4B
FIG. 4C

1502

1504

METHODS AND SYSTEMS FOR HAND GESTURE-BASED CONTROL OF A DEVICE

CROSS-REFERENCE TO RELATED APPLICATIONS

The present disclosure is a continuation application of International Application No. PCT/CN2020/080562, entitled "METHODS AND SYSTEMS FOR HAND GESTURE-BASED CONTROL OF A DEVICE", filed Mar. 23, 2020, the entirety of which is hereby incorporated by reference.

FIELD

The present disclosure relates to remote control of devices, in particularly, to methods and systems for detection and recognition of a hand gesture, and controlling a device, such as a television or a smartphone, using hand gestures.

BACKGROUND

Remote control of a device (e.g., a smartphone, tablet, television, etc.) using machine vision-based detection (generally referred to in the art as computer vision) of hand gestures in a sequence of frames of a digital video captured by a camera of such devices has been of interest for providing an improved user experience. Existing solutions for performing gesture detection and recognition in a sequence of frames of a digital video have been based on classification of a video action (i.e., classification of motion of a hand detected in and tracked over multiple frames of the sequence of frames of a digital video). This typically requires performing gesture segmentation and recognition on a sequence of frames digital video. However, performing gesture segmentation and recognition on a sequence of digital images typically incurs significant computational cost yet relatively low accuracy.

Aside from the challenges of performing gesture segmentation and recognition on a sequence of frames of a digital video, hand detection in real-life applications also face challenges. For example, performing gesture detection on a sequence of frames of a digital video is typically difficult in a complex background (e.g., in a user's living space, which may be cluttered), when there is a long distance from the user to a device (e.g., when the user is controlling a device that is mounted on a wall), or a low-light environment (e.g., at nighttime). Performing gesture detection and recognition on a sequence of frames of a digital video in such conditions often result in unacceptably high occurrence of false positives and false negatives. A challenge also arises when there are multiple humans in the detection zone, which leads to possible confusion in detecting and recognizing gestures.

Machine learning-based approaches for performing segmentation and recognition on a sequence of frames of a digital video also face particular challenges. For example, to obtain satisfactory accuracy, a gesture detector configured to perform gesture detection and segmentation and classifier may be trained using large deep convolutional neural networks, which typically requires high computational resources. Further, in order to detect smaller hands at a farther distance, a frame of the digital video needs to have high resolution, which leads to a significant increase in computational cost. Another challenge is that a bounding box generated by a gesture (or hand) detector may not be of a size that matches the expected input of a subsequent classifier.

Accordingly, it would be useful to provide more accurate and less computationally expensive machine-learning based methods and systems for detection and recognition of gestures in a sequence of frames of a digital video captured by a camera of a device for remote control of the device, even in non-ideal real-life environments.

SUMMARY

In various examples, the present disclosure describes a machine-learning based system that is trained end-to-end for detection and recognition of hand gestures in a sequence of frames of a digital video captured by a camera of a device for remote control of the device. The disclosed machine-learning based system enable real-time detection and recognition of hand gestures in a sequence of frames of a digital video captured by a camera of a device that for remote control of the device. Various example machine-learning based systems described herein may enable detection and recognition of hand gestures in a sequence of frames of a digital video captured by a camera of a device for remote control of the device with higher accuracy than existing approaches, in long-distance and/or low-illumination scenarios.

In some examples, the present disclosure describes a method for processing gesture input. The method includes: processing each respective frame in of sequence of frames to determine a location of at least one detected instance of a distinguishing anatomical feature in the respective frame; defining, for at least a selected one of the at least one detected instance of the distinguishing anatomical feature, a virtual gesture-space based on the location of the selected one instance of the distinguishing anatomical feature, the virtual gesture-space being a defined space for detecting and tracking a gesture input; processing, using each frame of the sequence of frames in only the virtual gesture-space, to detect at least one hand, generate information from detecting the at least one hand and predict, using information generated from detecting the at least one hand, a gesture class associated with the at least one hand, outputting a command input corresponding to the predicted gesture class associated with the at least one hand.

In any of the above examples, the distinguishing anatomical feature may be a human face.

In any of the above examples, there may be a plurality of detected instances of the distinguishing anatomical feature, one virtual gesture-space may be defined for each respective detected instance, and each virtual gesture-space may be processed to perform hand detection and tracking.

In any of the above examples, the method may also include: after the virtual gesture-space has been defined, processing at least one subsequent input frame by performing hand detection and tracking in the defined virtual gesture-space without further performing detection of the distinguishing anatomical feature in the subsequent input frame.

In any of the above examples, the method may also include: using information generated from detecting and tracking the at least one hand, redefining the virtual gesture-space based on a detected location of the at least one hand.

In any of the above examples, the method may also include: after the virtual gesture-space has been redefined based on the detected location of the at least one hand, processing at least one subsequent input frame by performing hand detection and tracking in the redefined virtual gesture-space without further performing detection of the distinguishing anatomical feature in the subsequent input frame.

In any of the above examples, the information generated from detecting and tracking the at least one hand may include a bounding box defining the at least one hand in the input frame, and gesture classification may be performed using the bounding box.

In any of the above examples, the method may also include: defining one or more subspaces in the virtual gesture-space; information generated from detecting and tracking the at least one hand may include information indicating the at least one hand is detected in one of the one or more subspaces; and each subspace may be associated with a respective mouse input.

In some examples, the present disclosure describes an apparatus including: a processing device coupled to a memory storing machine-executable instructions thereon. The instructions, when executed by the processing device, causes the apparatus to perform any of the methods described above.

In any of the above examples, the apparatus may be a gesture-controlled device, and the determined gesture class may be used to determine a command input to the gesture-controlled device.

In any of the above examples, the apparatus may include a camera for capturing the input frame.

In any of the above examples, the gesture-controlled device may be one of: a television; a smartphone; a tablet; a vehicle-coupled device; an internet of things device; an artificial reality device; or a virtual reality device.

In some examples, the present disclosure describes a computer-readable medium having machine-executable instructions stored thereon. The instructions, when executed by a processing device of an apparatus, cause the apparatus to perform any of the methods described above.

The examples disclosed herein may enable more accurate and/or efficient detection of gesture inputs, by defining a virtual gesture-space that is used to detect a user's hand. For example, detection of a human face may be generally faster and/or more accurate, and a detected face may be the basis for a virtual gesture-space. In some examples, a detected face may be the basis for implementation of gesture-based control of a virtual mouse. This may provide an intuitive method for gesture-based control of a device.

BRIEF DESCRIPTION OF THE DRAWINGS

Reference will now be made, by way of example, to the accompanying drawings which show example embodiments of the present application, and in which:

FIGS. 4A-4C illustrate some example dynamic gestures that may be detected and recognized by an example gesture-controlled device;

Similar reference numerals may have been used in different figures to denote similar components.

DESCRIPTION OF EXAMPLE EMBODIMENTS

In various examples, the present disclosure describes methods and systems enabling gesture-based control of a device. For example, a gesture-controlled device may be a television (e.g., smart TV), a mobile communication device (e.g., smartphone), a tablet device, a desktop device, a vehicle-based device (e.g., a dashboard device) or a smart speaker, among other possibilities. The gesture-based control described herein may be used to enable user interaction with any user interface provided by the gesture-controlled device, including user interfaces with or without display output. Examples of the present disclosure may also be implemented for augmented reality (AR), virtual reality (VR), or video game applications, among other possibilities.

For simplicity, the present disclosure describes examples in the context of a gesture-controlled device having a display output (e.g., a smart TV, smartphone, or tablet), and describes gesture-based control for interacting with playback of a video. However, it should be understood that the present application is not limited to such embodiments, and may be used for gesture-based control of a variety of devices in a variety of applications.

Figure 1:
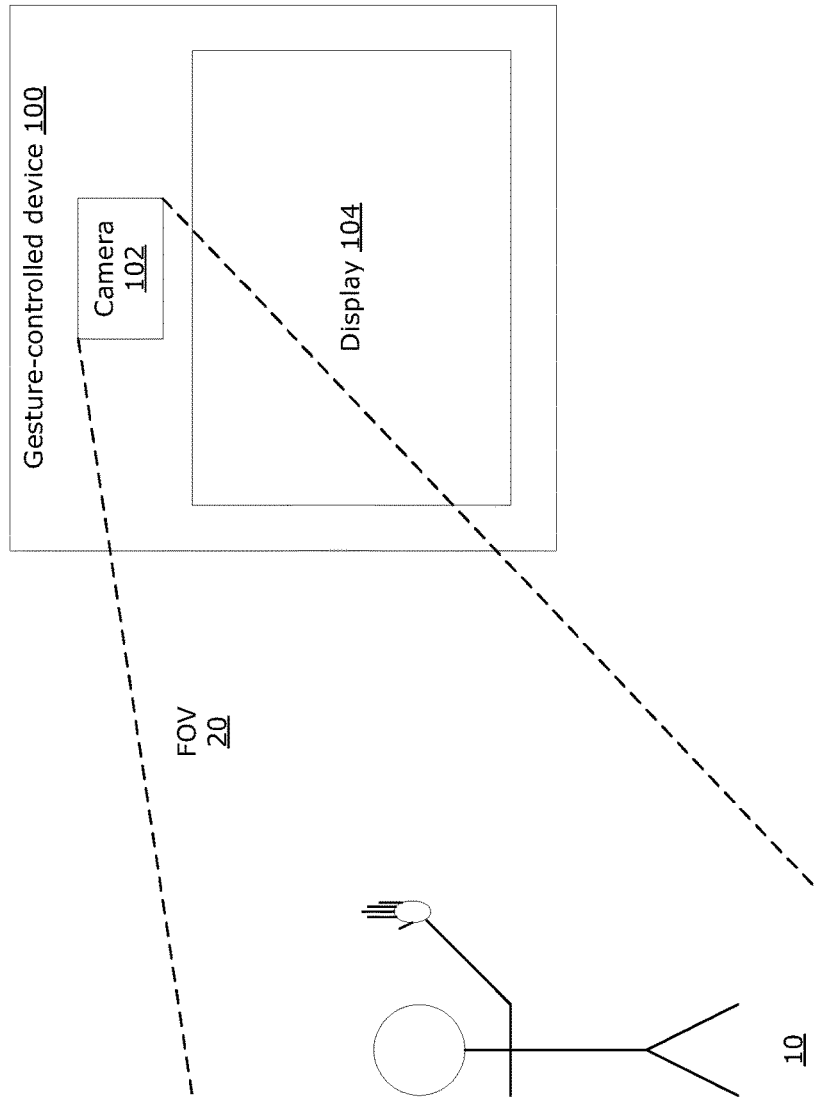
FIG. 1 is a block diagram illustrating a user interacting with an example gesture-controlled device.

FIG. 1 shows an example of a user 10 interacting with a gesture-controlled device 100. In this simplified diagram, the gesture-controlled device 100 includes a camera 102 that captures a sequence of frames (e.g. digital images) in a field-of-view (FOV) 20 in which the sequence of frames includes a gesture input. The FOV 20 may include at least a portion of the user 10, in particular a face and a hand of the user 10, as discussed further below. Notably, the FOV 20 in real-life use (e.g., outside of a laboratory setting) typically includes more than just the user 10. For example, the FOV 20 may also include other objects, a background scene, or possible other humans. The gesture-controlled device 100 may, instead of the camera 102, have another sensor capable of sensing gesture input from the user 10, for example any image capturing device/sensor (e.g., an infrared image sensor) that captures a sequence of frames (e.g., infrared images) that include a gesture input in the FOV 20 of the image capturing device/sensor. The gesture-controlled device 100 also includes a display 104 providing an output, such as a video. Although the gesture-controlled device 100 includes a camera 102 in the embodiment shown in FIG. 1, in other embodiments, the camera 102 may be a peripheral device that is in communication with the gesture-controlled device 100.

Figure 2:
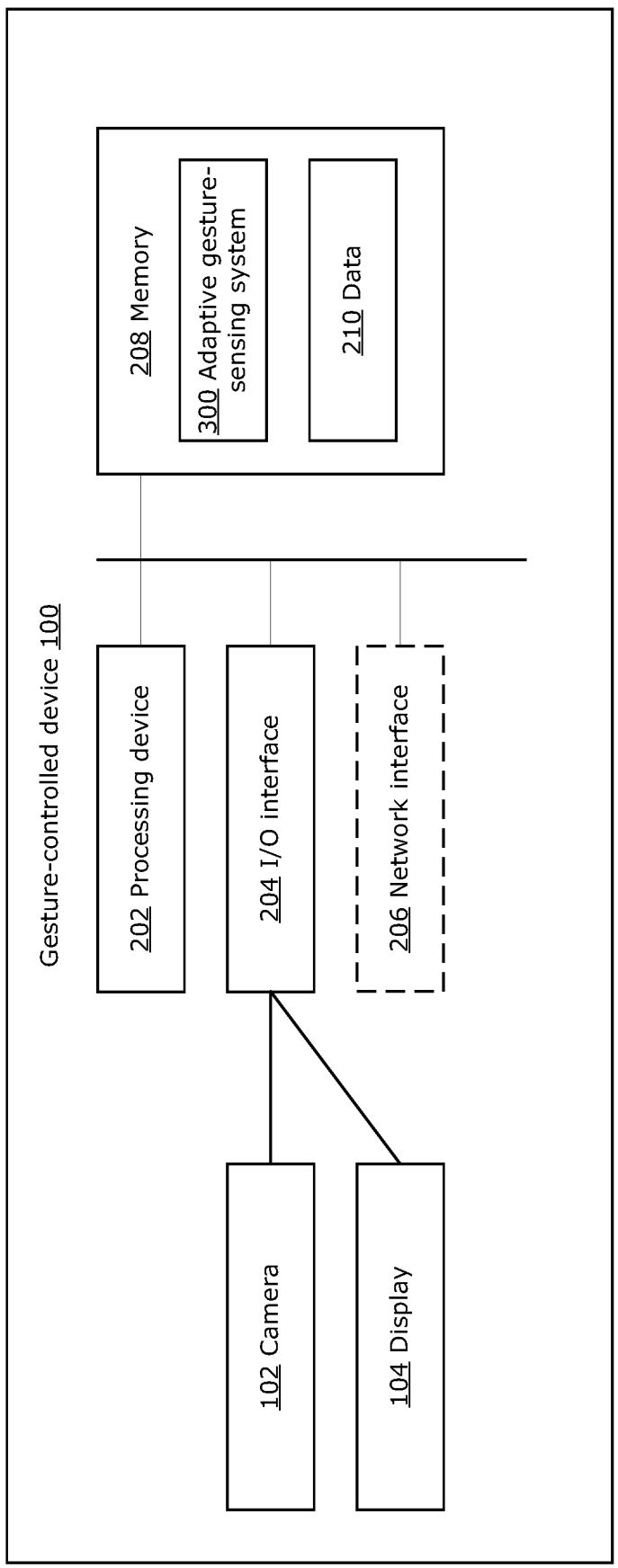
FIG. 2 is a block diagram illustrating some components of an example gesture-controlled device.

FIG. 2 is a block diagram showing some components of the gesture-controlled device 100. Although an example embodiment of the gesture-controlled device 100 is shown and discussed below, other embodiments may be used to implement examples disclosed herein, which may include components different from those shown. Although FIG. 2 shows a single instance of each component, there may be multiple instances of each component shown.

The gesture-controlled device 100 includes one or more processing devices 202, such as a processor, a microprocessor, an application-specific integrated circuit (ASIC), a field-programmable gate array (FPGA), a dedicated logic circuitry, a dedicated artificial intelligence processor unit, or combinations thereof. The gesture-controlled device 100 also includes one or more input/output (I/O) interfaces 204, which interfaces input devices such as the camera 102 and output devices such as the display 104. The gesture-controlled device 100 may include other input devices (e.g., buttons, microphone, touchscreen, keyboard, etc.) and other output devices (e.g., speaker, vibration unit, etc.). The camera 102 (or other input device) may have capabilities for capturing a sequence of frames of that includes a gesture input. The captured frames may be provided by the I/O interface(s) 204 to memory(ies) 208 for storage (e.g. buffering therein, and provided to the processing device(s) 202 to be processed in real-time or near real-time (e.g., within 10 ms).

The gesture-controlled device 100 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processing device(s) 202, such as to carry out examples described in the present disclosure. For example, the memory(ies) 208 may include instructions for executing an adaptive gesture-sensing system 300. The memory(ies) 208 may include other software instructions, such as for implementing an operating system and other applications/functions. The memory(ies) 208 may also include data 210, such as video content files that may be provided as output via the display 104.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with each other via a bus, for example.

To help in understanding the present disclosure, a discussion of gestures is first provided. In the present disclosure, a hand gesture is generally defined as a distinct hand shape that may be recognized by the gesture-controlled device 100 as a particular command input. A hand gesture may have different shapes and movement. For example, hand gestures may be recognized by the gesture-controlled device 100 as belonging to one of the classes shown in FIGS. 3A-3H. A hand gesture such as those shown in FIGS. 3A-3H, that is present in a sequence of frames (e.g. images) captured by the camera 102 is referred to as a gesture input.

Figure 3A:
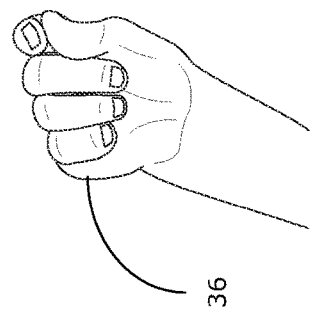
FIGS. 3A-3H illustrate some example gesture classes that may be detected and recognized by an example gesture-controlled device.
Figure 3B:
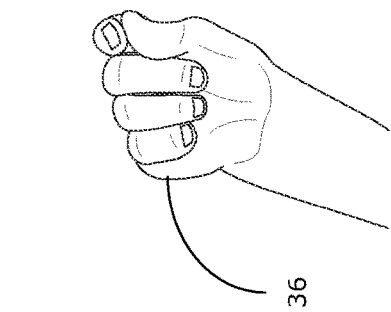
Figure 3C:
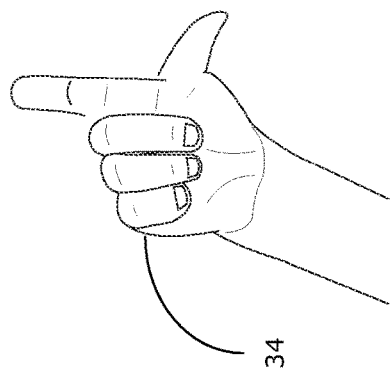
Figure 3D:
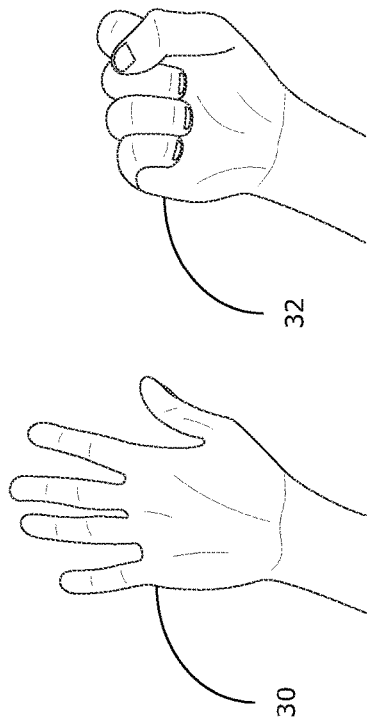
Figure 3H:
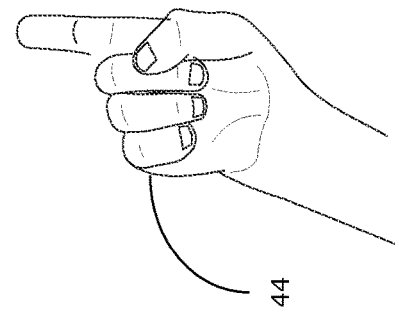
Figure 3G:
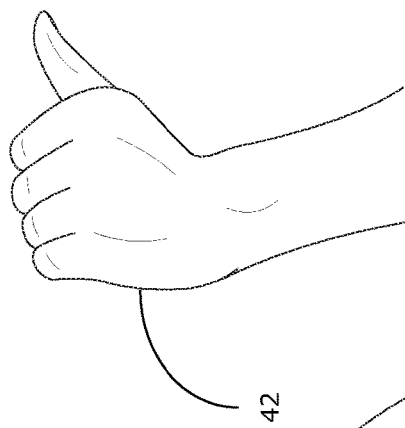
Figure 3F:
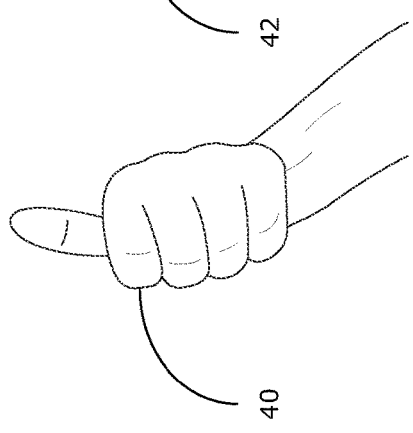
Figure 3E:
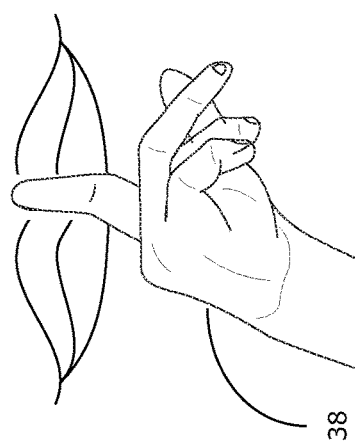

FIG. 3A illustrates an "open hand" gesture 30; FIG. 3B illustrates a "fist" (or "closed hand") gesture 32; FIG. 3C illustrates a "pinch open" gesture 34; FIG. 3D illustrates a "pinch closed" gesture 36; FIG. 3E illustrates a "mute" (or "silence") gesture 38; FIG. 3F illustrates a "like" (or "approve") gesture 40; FIG. 3G illustrates an "others" (or "next") gesture 42; and FIG. 3H illustrates a "touch" (or "select") gesture 44. Other gesture classes may be recognized by the gesture-controlled device 100.

Based on such gesture classes, hand gestures may be categorized into static or dynamic gestures. A static gesture is defined by a single gesture class, and is held in a generally fixed location (e.g., within a defined area that allows for some margin of error) for at least a defined period of time (e.g., 1 second) or at least a defined number of consecutive frames (e.g., 100 frames) in sequence of frames captured by the camera 102. For example, the static open hand gesture 30 may be recognized by the gesture-controlled device 100 (e.g. the adaptive gesture sensing system 300), and in the context of a video playback may be interpreted as a pause command input. The static fist gesture 32 may be recognized by the gesture-controlled device 100, and in the context of a video playback may be interpreted as a stop command input.

A dynamic gesture is defined by a combination of one or more gesture classes, locations, and/or movements. For example, a dynamic gesture may be a single gesture class that changes in location over time (e.g., detected at different locations over the sequence of frames captured by the camera 102). The open hand gesture 30 that changes in location may be recognized by the gesture-controlled device 100 (e.g. the adaptive gesture sensing system 300) and interpreted as a command to drag or move an interface object such as a displayed icon).

FIG. 4A illustrates another type of dynamic gesture which may be a combination of gesture classes. In FIG. 4A, the dynamic gesture includes a combination of the touch gesture 44 followed by the fist gesture 32. This dynamic gesture may be recognized by the gesture-controlled device 100 (e.g. the adaptive gesture-sensing system 300 running on the gesture-controlled device 100) and interpreted as a command input equivalent to using a mouse device to select and then click on an interface object. In another example, the pinch open gesture 34 followed by the pinch closed gesture 36 may together be recognized as a "pinching" dynamic gesture, which may be recognized by the gesture-controlled device 100 and interpreted as a zoom out command input.

More complex dynamic gestures may involve both combination of gesture classes as well as changes in location. For example, in FIG. 4A, if the touch gesture 44 is detected as changing in location over time (e.g., detected in different locations in a sequence of frames captured by the camera device 102) and followed by the fist gesture 32, the gesture-controlled device 100 (e.g. the adaptive gesture-sensing system 300 running on the gesture-controlled device 100) may interpret the complex dynamic gesture as a command input to move a displayed cursor in a way that mirrors the change in location of the touch gesture 44 followed by a click command when the fist gesture 32 is detected.

In another example, the pinch open gesture 36, followed by the pinch closed gesture 38, followed by a change in location of the pinch closed gesture 38, and followed by the pinch open gesture 36 again may together be recognized by the gesture-controlled device 100 (e.g. the adaptive gesture-sensing system 300 running on the gesture-controlled device 100) as a dynamic "pinch-drag-release" gesture. It should be noted that dynamic gestures that include changes in location may be interpreted as different inputs depending on the particular change in location. For example, a pinch-drag-release gesture with a vertical change in location 46 (or a vertical "drag") of the pinch closed gesture 38, as shown in FIG. 4B, may be interpreted in the context of a video playback as a command input to change the volume. In contrast, a pinch-drag-release gesture with a horizontal change in location 48 of the pinch closed gesture 38, as shown in FIG. 4C, may be interpreted in the context of a video playback as a command input to move forward or backward in the video. Such a pinch-drag-release dynamic gesture may provide an intuitive and convenient way for a user to interact with the gesture-controlled device 100, and may also enable the gesture input to be detected and recognized by the gesture-controlled device 100 (e.g. the adaptive gesture-sensing system 300 running on the gesture-controlled device 100) with relatively high accuracy. In particular, the pinch-drag-release dynamic gesture may be detected and recognized by breaking down the dynamic gesture into its static gesture components (e.g., pinch open gesture 36, followed by pinch closed gesture 38, followed by another pinch open gesture 36).

Some traditional, existing computer-vision techniques for hand gesture recognition perform hand detection, hand shape classification, and gesture recognition based on hand shapes and locations in a sequence of frames (e.g., digital images) captured by a camera 102. Gesture segmentation and recognition is generally computationally expensive. Further, it is often challenging to process a sequence of frames captured by a camera 102 to detect and recognize hand gestures (whether static or dynamic) when the sequence of frames are captured by the camera 102 of the gesture-controlled device 100 in an uncontrolled and possibly complex environment (e.g., with a cluttered background, when the user is at a far distance from the device, in a low-light environment, or when there a multiple humans in the FOV).

In various examples, the present disclosure describes solutions that enable more accurate and efficient gesture detection and recognition in sequence of frames captured by a camera of a gesture-controlled device. In some examples, the present disclosure describes an adaptive gesture-sensing system that makes use of a virtual gesture-space, to reduce the area in each frame of a sequence of frames captured by a camera to be processed for gesture detection. In some examples, the present disclosure also describes a state-based (instead of motion-based) approach to recognize a dynamic gesture. It will be appreciated that the present disclosure includes additional aspects and features.

The present disclosure describes the use of a virtual gesture-space, at least initially defined as a space surrounding a user's face, for processing each frame of a sequence of frames captured by a camera for detecting hand gestures in the sequence of frames. The virtual gesture-space should be smaller than the FOV 20 captured by the camera 102. Only hand gestures (e.g. gesture inputs) detected and recognized within the virtual gesture-space may be considered valid hand gestures (e.g. gesture inputs). The use of a virtual gesture-space may enable a reduction in false positives in detection of hand gestures in the sequence of frames (e.g., particularly in complex backgrounds), may make it easier to associate a hand gesture to a particular user, and may enable more efficient processing of the sequence of frame to detect and recognize hand gestures (e.g. gesture inputs).

Figure 5:
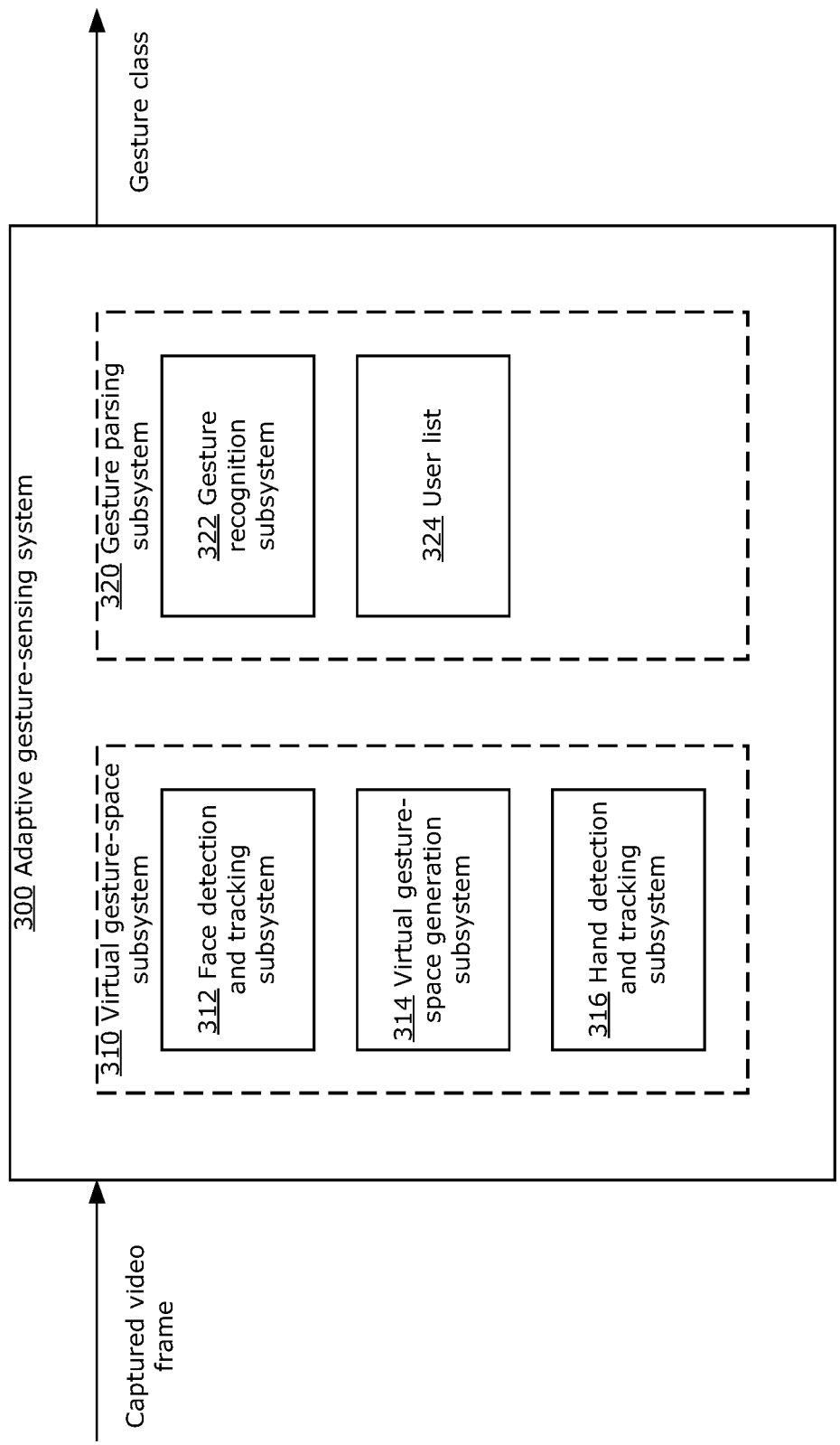
FIG. 5 is a block diagram illustrating some details of an example adaptive gesture-sensing system that may be implemented in an example gesture-controlled device.

FIG. 5 is a block diagram illustrating some example subsystems of the adaptive gesture-sensing system 300. In this example, the adaptive gesture-sensing system 300 may be implemented using a virtual gesture-space subsystem 310 and a gesture parsing subsystem 320. In the following examples, the adaptive gesture-sensing system 300 will be described as including both subsystems 310, 320 or providing the functions of both subsystems 310, 320. However, in other examples, the adaptive gesture-sensing system 300 may include (or provide the functions of) only one of the subsystems 310, 320. For example, the adaptive gesture-sensing system 300 may (e.g., using the virtual gesture-space subsystem 310) provide only adaptive generation of the virtual gesture-space and detection of hand gestures in a sequence of frames of captured by the camera 102 of the gesture-controlled device 100 that are within the virtual gesture-space, and gesture recognition and parsing may be performed by another component of the gesture-controlled device 100 (e.g., using any suitable existing gesture recognition techniques). In another example, the adaptive gesture-sensing system 300 may (e.g., using the gesture parsing subsystem 320) provide only gesture recognition and management of multiple users, and gesture detection may be performed by another component of the gesture-controlled device 100 (e.g., using any suitable existing gesture detection techniques).

In some examples, the adaptive gesture-sensing system 300 may not include distinct subsystems 310, 320. Instead, the sub-blocks of the subsystems 310, 320 may be considered sub-blocks of the adaptive gesture-sensing system 300 itself. Thus, the implementation of the adaptive gesture-sensing system 300 using distinct subsystems 310, 320 is optional.

The adaptive gesture-sensing system 300 includes a face detection and tracking subsystem 312, a virtual gesture-space generation subsystem 314, a hand detection and tracking subsystem 316, a gesture recognition subsystem 322, and a user list 324. The face detection and tracking subsystem 312, virtual gesture-space generation subsystem 314, and hand detection and tracking subsystem 316 may be part of the virtual gesture-space subsystem 310; and the gesture recognition subsystem 322 and user list 324 may be part of the gesture parsing subsystem 320.

In some examples, instead of or in addition to the face detection and tracking subsystem 312, another subsystem (not shown) may be used for detection and tracking of a different anatomical feature (e.g., an entire human body, or a human torso) in a sequence of frames of captured by the camera 102. As will be discussed further below, a different anatomical feature may be used, instead of or in addition to the human face, as the basis for generating the virtual gesture-space. For simplicity, the present disclosure will focus on the use of face detection and tracking in a sequence of frames captured by the camera 102, however it should be understood that this is not intended to be limiting.

A frame of a sequence of frames captured by the camera 102 0 is received as an input frame to the adaptive gesture-sensing system 300. The face detection and tracking subsystem 312 performs face detection on the input frame. The face detection and tracking subsystem 312 may use any suitable face detection technique to detect a face in the input frame and to generate a bounding box for the detected face. The bounding box may be a two-dimensional (2D) or three-dimensional (3D) box that is centered on and surrounds the face detected in the input frame.

The bounding box generated for the face detected in the input frame is used by the virtual gesture-space generation subsystem 314 to define the virtual gesture-space. In the present disclosure, a virtual gesture-space (or simply gesture-space) refers to a 2D or 3D space that is defined in the input frame and maps to a virtual space in the real-life environment of the user 10, in which a hand gesture (e.g. a gesture input) may be detected. In other words, the user 10 may make a hand gesture within the virtually defined 2D or 3D virtual gesture-space in order to provide a command input to the gesture-controlled device 100. Gestures performed outside of the virtual gesture-space may not be detected and may not be recognized by the gesture-controlled device 100 as a command input. The dimensionality of the virtual gesture-space may or may not match the dimensionality of the bounding box of the face (e.g., the bounding box of the face may be 2D and the virtual gesture-space may be 3D).

The virtual gesture-space defined by the virtual gesture-space generation subsystem 314 is used by the hand detection and tracking subsystem 316 to perform hand detection and tracking in the sequence of frames captured by the camera. In particular, the hand detection and tracking subsystem 316 may analyze only the defined virtual gesture-space within the input frame and each subsequent frame in the sequence of frames to detect a hand and track the hand in the sequence of frames. The hand detection and tracking subsystem 316 may use any suitable hand detection technique to detect a hand in the input frame and to define a 2D or 3D bounding box for the detected hand.

In some examples, the face detection and tracking subsystem 312 may include a trained neural network that in configured for performing face detection. Similarly, the hand detection and tracking subsystem 316 may include another trained neural network configured for performing hand detection. For example, a suitable trained neural network configured for face or hand detection may be a trained object detector such as using YoloV3 (e.g., as described in Redmon et al. "Yolov3: An incremental improvement," arXiv preprint arXiv:1804.02767, 2018) based on a residual neural network (ResNet) architecture such as ResNet34 (e.g., as described in He, Kaiming, et al. "Deep residual learning for image recognition." Proceedings of the IEEE conference on computer vision and pattern recognition. 2016). Another example of a suitable trained neural network configured for face or hand detection may be a trained single shot detector (SSD) such as multibox SSD (e.g., as described in Liu et al. "Ssd: Single shot multibox detector." European conference on computer vision. Springer, Cham, 2016.) based on a convolutional neural network (CNN) architecuture such as MobileNetV2 (e.g., as described in Sandler et al. "Mobilenetv2: Inverted residuals and linear bottlenecks." Proceedings of the IEEE Conference on Computer Vision and Pattern Recognition. 2018.). Face and hand tracking may be performed by the face detection and tracking subsystem 312 and the hand detection and tracking subsystem 316, respectively, using the Lucas-Kanade optical flow technique (as described in Lucas et al. "An iterative image registration technique with an application to stereo vision." Proceedings of Imaging Understanding Workshop, 1981).

The bounding box defined for the detected hand is used by the gesture recognition subsystem 322 to perform identification and classification of the shape of the detected hand as a gesture class. The gesture recognition subsystem 322 may use any suitable classification technique to classify the shape of the detected hand as a particular gesture class. For example, the gesture recognition subsystem 322 may include a neural network (e.g., a CNN) that has been trained to classify a gesture according to a predefined set of gesture classes. The neural network has been trained using known machine learning algorithms to learn the parameters (e.g. weights) of the neural network. The trained neural network receives a bounding box for a detected hand gesture and predicts a particular gesture class from a predefined set of gesture classes that corresponds to the bounding box. The gesture class predicted by the gesture recognition subsystem 322 may be outputted (e.g., as a label) from the adaptive gesture-sensing system 300.

A software application (e.g., an operating system) of the gesture-controlled device 100 may translate the gesture class outputted by the adapted gesture-sensing system 300 into a command input. The translation of the gesture class into the command input may be application-dependent. For example, a given gesture class may be translated into a first command input when a first application is active, but may be translated into a second command input (or may be considered invalid) when a second application is active.

In some examples, the adaptive gesture-sensing system 300 stores and maintains the user list 324 to keep track of the primary user. For example, there may be multiple humans in the FOV 20 of the camera 102. The face detection and tracking subsystem 312 may thus detect and track multiple human faces in a sequence of frames captured in the FOV 20 by the camera 102. Each detected face may belong to a human who is potentially a user that can provide input to the gesture-controlled device 100. Accordingly, each detected human may be considered a user (or potential user) even if the detected human is not currently providing a recognized hand gesture (e.g. gesture input). The user list 324 keeps track of all detected users, and ranks the detected users according to some predefined criteria (e.g., based on size of user, distance of user from gesture-controlled device 100, whether user's gaze is directed towards gesture-controlled device 100, etc.). The highest ranking user in the user list 324 may be considered the primary user. A hand gesture (e.g. gesture input) in the sequence of frames that is associated with the primary user may be prioritized over any other hand gestures (e.g. gesture inputs) detected in the sequence of frames that are associated with other detected users. In some examples, only authorized or pre-registered users may be included in the user list 324. For example, a user profile may be associated with an authorized or pre-registered user, and the user profile may contain data (e.g., biometric data) enabling the authorized or pre-registered user to be identified by the gesture-controlled device 100 (e.g., using suitable facial recognition techniques). Such facial recognition of authorized or pre-registered users may be performed by the adaptive gesture-sensing system 300 or by a separate facial recognition system of the gesture-controlled device 100. By restricting the user list 324 to include only authorized or pre-registered users, unauthorized gesture-based control of the device 100 may be avoided. Additionally, false positive detection of gesture input may be reduced.

Although the adaptive gesture-sensing system 300 is illustrated as having different sub-blocks (or subsystems), it should be understood that this is not intended to be limiting. For example, the adaptive gesture-sensing system 300 may be implemented using greater or fewer numbers of sub-blocks (or subsystems), or may not require any sub-blocks (or subsystems). Further, functions described herein as being performed by a particular sub-block (or subsystem) may instead be performed by another sub-block (or subsystem).

Generally, the functions of the adaptive gesture-sensing system 300 may be implemented in various suitable ways and remain within the scope of the present disclosure.

Examples of the operation of the adaptive gesture-sensing system 300 are now described.

Figure 6:
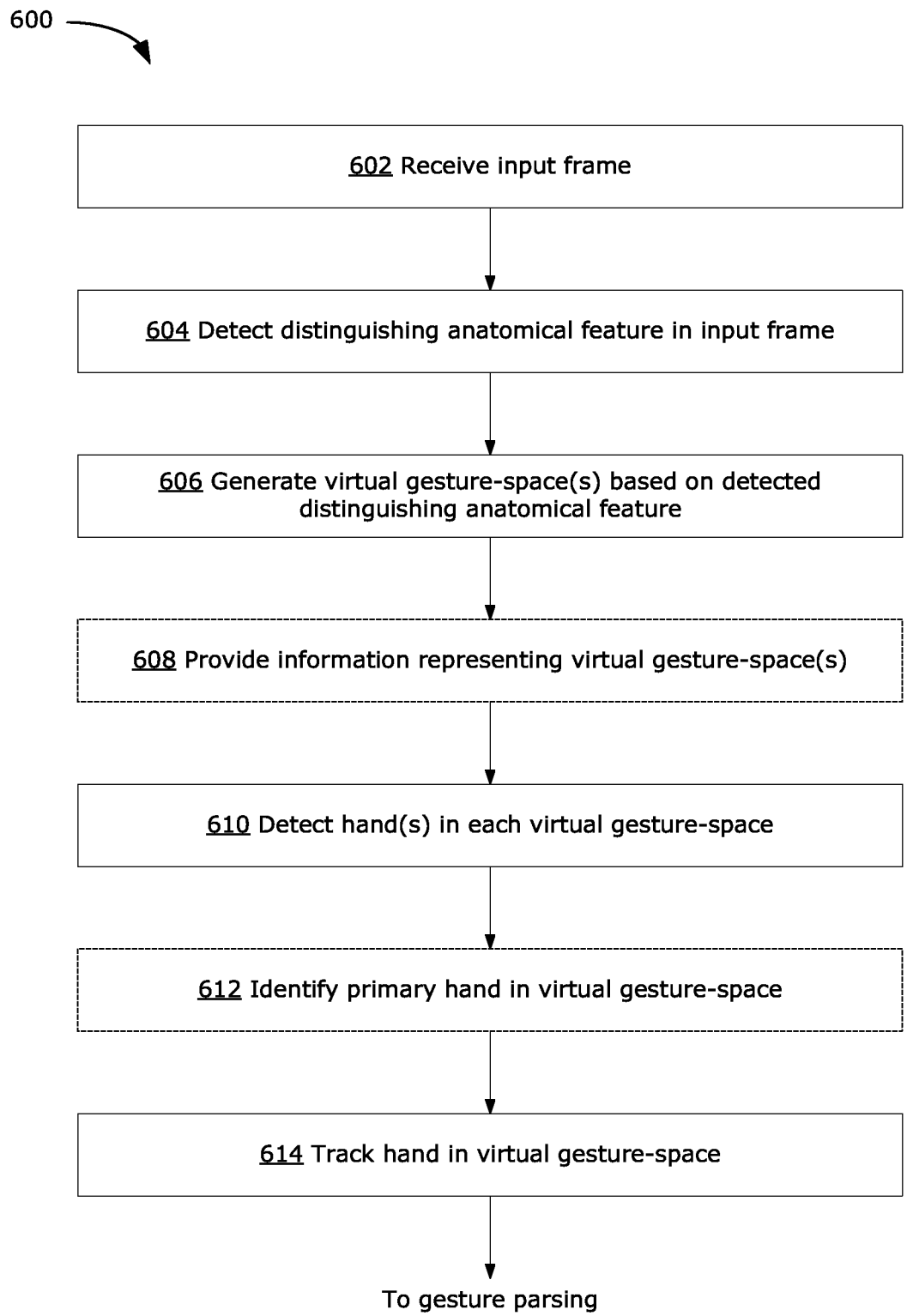
FIG. 6 is a flowchart illustrating an example method for hand detection using a virtual gesture-space.

FIG. 6 is a flowchart illustrating an example method 600 that may be performed by the adaptive gesture-sensing system 300, for example using the virtual gesture-space subsystem 310 (and subsystems 312, 314, 316). Method 600 may be carried out by routines or subroutines of software executed by processing device 202 of the gesture-controlled device 100. Coding of software for carrying out such routines or subroutines is well within the scope of a person of ordinary skill in the art having regard to the present disclosure. Method 600 may include additional or fewer steps or actions that shown and described, and may be performed in a different order. Computer-readable code executable by for example the processing device 202 may be stored in a computer-readable medium.

At 602, an input frame in a sequence of frames is received. Generally, the input frame and each subsequent frame to the input frame of the sequence of frames is received one at a time, in real-time or near real-time. The input frame (and each subsequent frame) may be the raw, unprocessed digital image captured by the camera 102, or may be minimally processed (e.g., normalized) digital image.

At 604, the adaptive gesture sensing system 300 detects a distinguishing anatomical feature in the input frame. The entire input frame may be processed at step 604. The distinguishing anatomical feature may be any part of a user's body that may be readily detected and distinguished from the background. An example is detection of a human face (e.g., using the face detection and tracking subsystem 312. In some situations, a face may be difficult to be detected, in which case a different anatomical feature (e.g., entire human body, or human torso) may be detected instead. As mentioned above, the anatomical feature may be detected using any suitable approach, including using any suitable computer vision techniques. Detecting the distinguishing anatomical feature may include determining a location (e.g., represented by a bounding box, or a coordinate) of the anatomical feature.

At 606, a virtual gesture-space is generated (e.g., using the virtual gesture-space generation subsystem 314) based on the detected distinguishing anatomical feature (e.g., detected face). In some examples, multiple instances of the distinguishing anatomical feature may be detected (e.g., multiple faces may be detected if there are multiple humans within the input frame captured in the FOV 20 by the camera 102), in which case one virtual gesture-space may be generated for each respective detected instance of the distinguishing anatomical feature. As will be discussed further below, in some examples there may only be one virtual gesture-space generated when multiple instances of the distinguishing anatomical feature are detected, or the generation of virtual gesture-space(s) may be based on ranking or prioritization of the detected instances of the distinguishing anatomical feature.

The virtual gesture-space may be generated using predefined equations related to the location of the respective anatomical feature detected in the input frame. For example, the virtual gesture-space may be generated by calculating a rectangular space relative to a bounding box of a detected face. Some example equations are provided further below.

Optionally, at 608, information about the generated virtual gesture-space may be provided by the adaptive gesture-sensing system 300, to enable the gesture-controlled device 100 to provide feedback to the user 10 about the generated virtual gesture-space. For example, the adaptive gesture-sensing system 300 may provide information indicative of the coordinates or other parameters of the virtual gesture-space, to enable the gesture-controlled device 100 to render on the display 104 (e.g., as an overlay on top of a live camera image) a representation of the virtual gesture-space to the user 10. In another example, the virtual gesture-space may be represented to the user 10 by having an inset or secondary window rendered on the display 104 by the gesture-controlled device 100 to show only a FOV corresponding to the virtual gesture-space. Other ways of providing feedback to the user 10 may also be suitable.

At 610, a hand is detected in the input frame in generated virtual gesture-space (e.g., using the hand detection and tracking subsystem 316). The detected hand may be associated (e.g., labeled) with the respective virtual gesture-space in which the hand was detected in the input frame. If there are multiple virtual gesture-spaces generated, an attempt may be made to detect a hand in each generated virtual gesture-space in the input frame. If a hand is not detected in a given virtual gesture-space in the input frame, that given virtual gesture-space may be ignored or discarded.

If no hand is detected in any of the generated virtual gesture-space(s) in the input frame, it may be determined that there is no hand gesture (e.g. gesture input) found in the input frame, and the method 600 may return to step 602 to receive the next input frame in the sequence of frames. Assuming that at least one hand is detected in at least one virtual gesture-space, the method 600 proceeds to optional step 612.

Optionally, at 612, if more than one hand is detected in a given virtual gesture-space in the input frame, one primary hand may be identified in the given virtual gesture-space. A primary hand may be identified based on, for example, the largest hand in the given virtual gesture-space in the input frame; the detected hand that is closest to the detected distinguishing anatomical feature (e.g., face) in the given virtual gesture-space in the input frame; or the detected hand that is closest in illumination and/or hue to the detected distinguishing anatomical feature (e.g., face) in the given virtual gesture-space in the input frame; among other possibilities. If there is only one hand detected in a given virtual gesture-space in the input frame, it may be assumed that the one hand is the primary hand.

At 614, the detected hand (or primary hand) is tracked in the respective virtual gesture-space (e.g., using the hand detected and tracking subsystem 316) in subsequent frames to the input frame of the sequence of frames. Tracking of the detected hand (or primary hand) is performed by processing each subsequent frame. Information from detecting and tracking the hand (or primary hand) in each subsequent frame is provided for further analysis and parsing. For example, a bounding box and optional identifier may be generated in order to track the detected hand in the subsequent frames. The bounding box (and optional identifier) may then be provided (e.g., to the gesture recognition subsystem 322) for analysis and parsing.

In some examples, the method 600 may be implemented by the adaptive gesture-sensing system 300 using only the virtual gesture-space subsystem 310. Instead of outputting a gesture class (as shown in FIG. 5), the adaptive gesture-sensing system 300 may output information about the tracked hand (e.g., the bounding box) to a conventional gesture recognition system, and the conventional gesture recognition system may perform the hand classification and gesture recognition on the information (e.g. the bounding box).

Instead of directly detecting the user's hand, the above-described example first detects a distinguishing anatomical feature (e.g., the user's face) in the input frame and generates a virtual gesture-space (which is smaller than the FOV in the input frame) based on the detected feature. Hand detection is then performed on the input frame only in the virtual gesture-space. The user's face may be used as the distinguishing anatomical feature for generating a virtual gesture-space because face detection is typically more accurate and reliable than hand detection. By restricting hand detection to the virtual gesture-space, the processing required for processing subsequent frames for hand detection may be simplified, false positives may be reduced, and it may be easier to identify the primary hand in subsequent frames for a gesture input.

In some examples, the method 600 may be used to process every frame captured by the camera 102. In other examples, the method 600 may only be used when a gesture input is expected. For example, the method 600 may be initiated in response to receiving an input (e.g., via keyboard input, mouse input or voice input). In some examples, the method 600 may be initiated based on detection of human attention. For example, the gesture-controlled device 100 may use an attention detection technique (e.g., may execute eye-tracking software) to determine whether a human is looking directly at the gesture-controlled device 100, and the method 600 may be initiated only when a direct human gaze at the gesture-controlled device 100 is detected. It may be useful to initiate the method 600 in response to detected human attention, to avoid false positives or incorrect interpretation of a gesture input.

Figure 7:
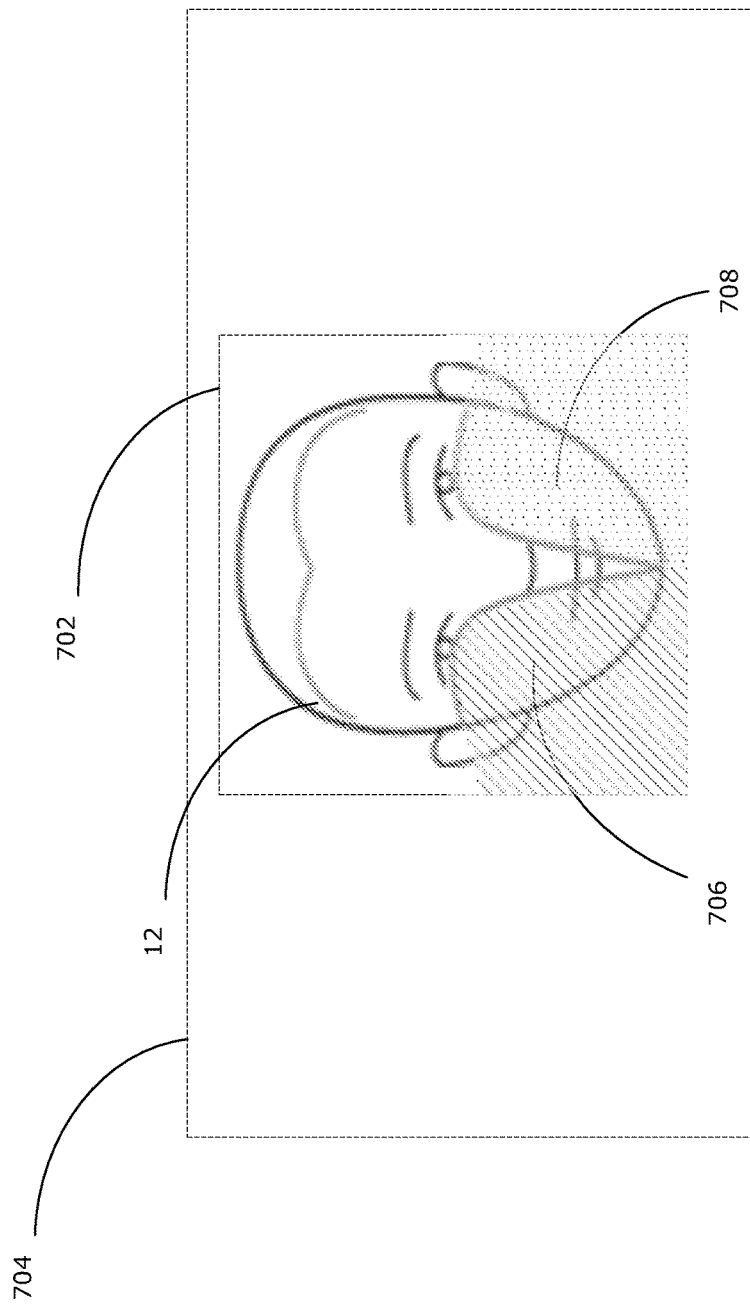
FIG. 7 illustrates an example of a virtual gesture-space including defined subspaces for implementing a virtual mouse.

FIG. 7 illustrates an example implementation of the method 600, in which the virtual gesture-space is generated based on a detected face. In this example, it is assumed that the face 12 of a primary user has been detected at 604, and the face 12 is used as the distinguishing anatomical feature as the basis for generating the virtual gesture-space at 606.

A bounding box 702 may be generated for the face 12 using any suitable face detection techniques, including computer vision based techniques as described above. In this example, the bounding box 702 is defined by the set of values $\{x_f, y_f, w_f, h_f\}$, where $x_f$ and $y_f$ respectively define the x and y coordinates (in a frame of reference defined by the adaptive gesture-sensing system 300) of the anchor point (e.g., center) of the bounding box 702, and $w_f$ and $h_f$ respectively define the width and height of the bounding box 702. On the basis of the bounding box 702, a virtual gesture-space 704 is generated (e.g., at step 606) and defined by the set of values $\{x_g, y_g, w_g, h_g\}$, where $x_g$ and $y_g$ respectively define the x and y coordinates (in the frame of reference defined by the adaptive gesture-sensing system 300) of the anchor point (e.g., center) of the virtual gesture-space 704, and $w_g$ and $h_g$ respectively define the width and height of the virtual gesture-space 704. For example, the following equations may be used to generate the virtual gesture-space 704:

$$x_g = x_f - \frac{\Delta_x}{\partial} w_g$$

$$y_g = y_f - \frac{\Delta_y}{\beta} h_g$$

$$w_g = \partial \cdot w_f$$

$$h_g = \beta \cdot h_f$$

where $(\Delta_x, \Delta_y)$ are predefined relative position parameters, and $(\partial, \beta)$ are predefined scale parameters. The parameters $(\Delta_x, \Delta_y)$ and $(\partial, \beta)$ may be predefined (e.g., by the user 10 or by a manufacturer of the gesture-controlled device 100) according to result in a desired size of the virtual gesture-space 704 and a desired positioning of the bounding box 702 within the virtual gesture-space 704. It should be noted that, in some examples, the virtual gesture-space 704 may be generated such that the bounding box 702 of the face 12 is partially or entirely outside of the virtual gesture-space 704. That is, although the face 12 may be used as the basis for generating the virtual gesture-space 704, it is not necessary that the virtual gesture-space 704 includes the face 12.

In the example of FIG. 7, the virtual gesture-space 704 is generated as a 2D space having rectangular shape. However, it should be understood that the virtual gesture-space 704 may be generated as a 2D space or a 3D space, and may be generated to have any geometrical shape (e.g., square, rectangle, circle, etc.), a regular shape, or an irregular shape.

In some examples, the virtual gesture-space 704 may further define one or more subspaces 706, 708, which may be used to implement particular input functions. The subspace(s) 706, 708 may be defined (e.g., by the virtual gesture-space generation subsystem 314) based on features of the detected face 12. For example, a left subspace 706 and a right subspace 708 may be defined in the virtual gesture-space, corresponding to lower left and right portions of the detected face 12, based on the locations of detected eyes and nose of the face 12. Detection of a touch (or point) gesture in the left subspace 706 may be interpreted as a left mouse button click input. Similarly, detection of a touch (or point) gesture in the right subspace 708 may be interpreted as a right mouse button click input. In this way, the virtual gesture-space 704 with defined subspaces 706, 708 may be used to implement a virtual mouse. In some examples, the dynamic gesture illustrated in FIG. 4A may be detected as a gesture input to implement a virtual cursor. The virtual cursor may be moved (and may be represented via a visual overlay displayed to the user 10) as the touch (or point) gesture 44 is tracked, and a mouse click input may be detected when the closed hand gesture 32 is detected. In this way, a virtual mouse may be implemented.

Figure 8B:
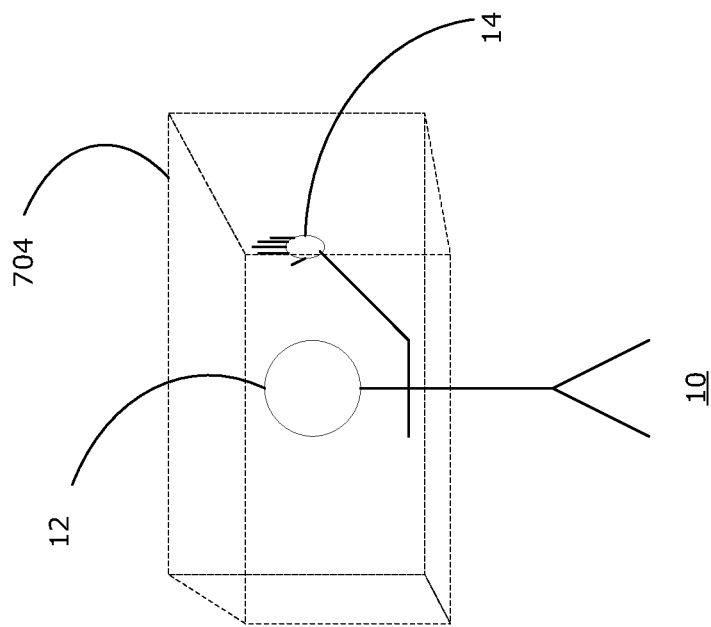
FIGS. 8A and 8B illustrate examples of 2D and 3D virtual gesture-spaces.
Figure 8A:
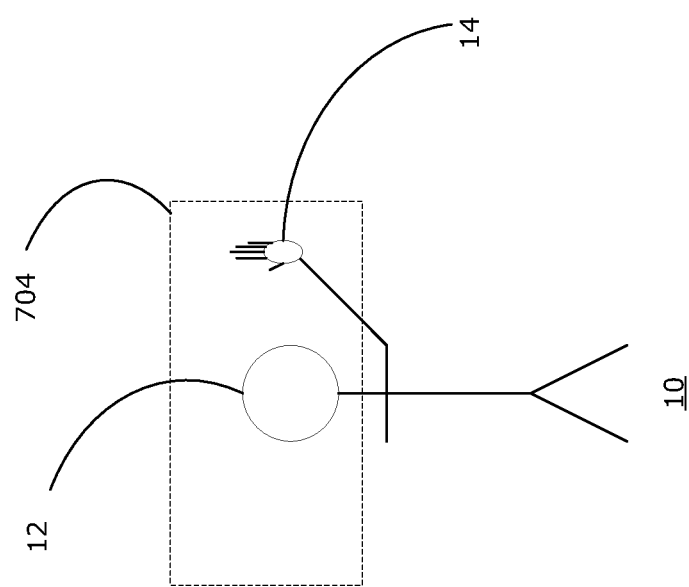

FIGS. 8A and 8B illustrate another example of the virtual gesture-space 704 generated based on a face 12 of a user 10 detected in an input frame in a sequence of frames captured by the camera 102. In FIG. 8A, the virtual gesture-space 704 is a 2D space and has a rectangular shape that includes both the face 12 and a hand 14 of the user 10 (e.g., similar to the example of FIG. 7). In FIG. 8B, the virtual gesture-space 704 is a 3D space that includes both the face 12 and the hand 14 of the user 10. The virtual gesture-space 704 may be generated as a 3D space when depth information is available. For example, depth information may be calculated from the sequence of frames using video analysis techniques. For example, the gesture-controlled device 100 may use two cameras 102 to calculate depth information (e.g., using computer stereovision techniques), or the camera 102 may be a RGB-depth (RGBD) camera capable of generating depth information (in addition to conventional RGB image information), or the gesture-controlled device 100 may include a time-of-flight (ToF) camera in addition to a conventional camera 102 to acquire RGB image information and additional corresponding depth information. In some examples, depth information may be captured using a sensor (e.g., infrared sensor) capable of capturing depth information, in addition to the camera 102. The use of a 3D virtual gesture-space 704 may be useful to enable depth-based gesture inputs (e.g., moving a hand closer to or farther from the gesture-controlled device 100) to be detected and recognized as command inputs.

In some examples, the virtual gesture-space is initially generated based on the distinguishing anatomical feature (e.g., face) detected in the input frame in the sequence of frames and may be subsequently redefined or updated based on the hand detected in subsequent frames to the input frame in the sequence of frames. In this way, the virtual gesture-space may follow the location of the detected hand, even if the hand moves far away from the distinguishing anatomical feature.

Figure 9:
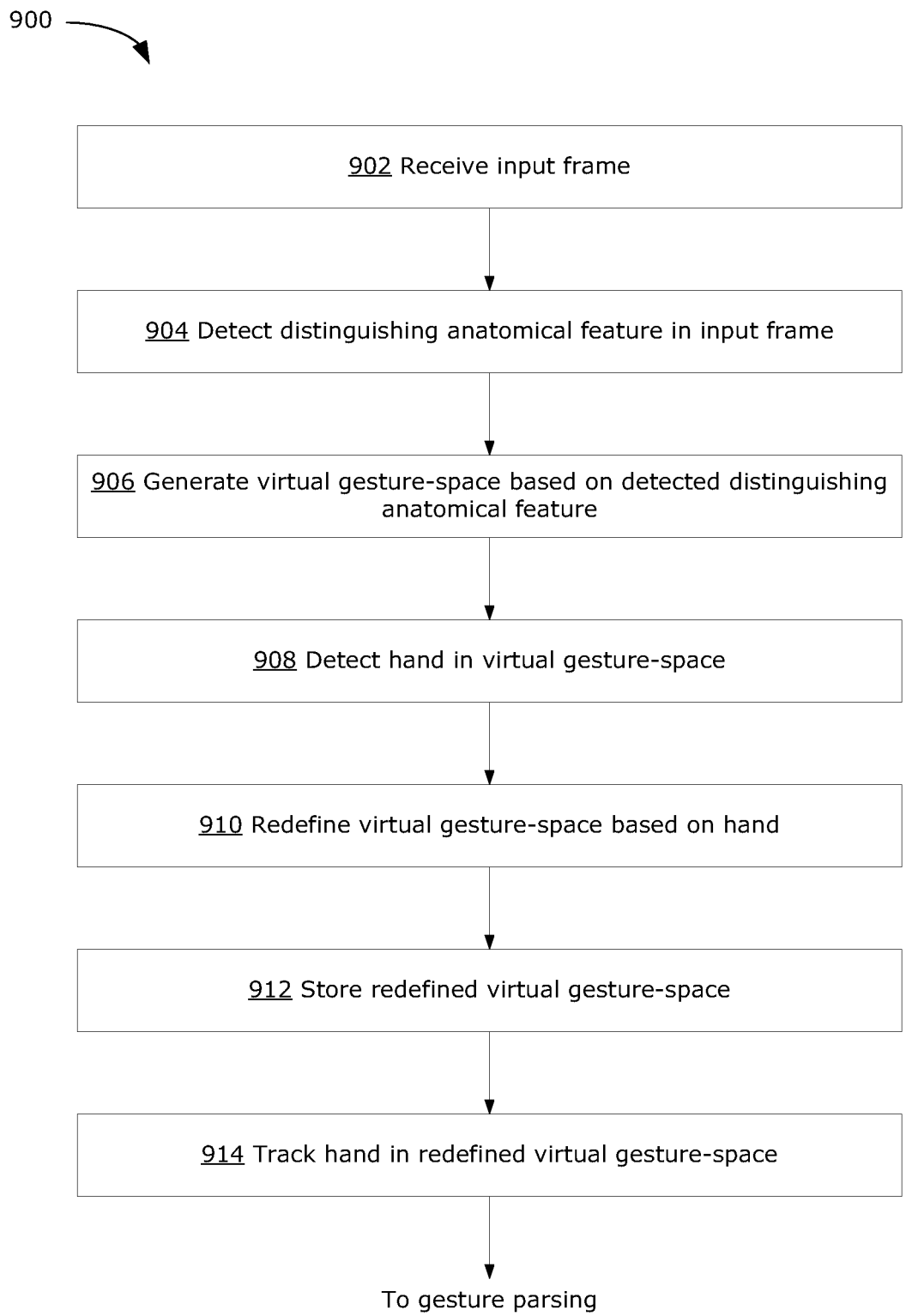
FIG. 9 is a flowchart illustrating an example method for hand detection and virtual gesture-space redefinition based on a detected hand.

FIG. 9 is a flowchart illustrating an example method 900 that may be performed by the adaptive gesture-sensing system 300, for example using the virtual gesture-space subsystem 310 (and subsystems 312, 314, 316). Method 000 may be carried out by routines or subroutines of software executed by processing device 202 of the gesture-controlled device 100. Coding of software for carrying out such routines or subroutines is well within the scope of a person of ordinary skill in the art having regard to the present disclosure. Method 000 may include additional or fewer steps or actions that shown and described, and may be performed in a different order. Computer-readable code executable by for example the processing device 202 may be stored in a computer-readable medium. The method 900 may include steps similar to those described for the method 600 above, in which case the similar steps may not be described again in detail.

At 902, an input frame of a sequence of frames is received. This step may be similar to step 602 described above.

At 904, the adaptive gesture sensing system 300 detects a distinguishing anatomical feature in the input frame. This step may be similar to step 604 described above.

At 906, a virtual gesture-space is generated (e.g., using the virtual gesture-space generation subsystem 314) based on the detected distinguishing anatomical feature (e.g., detected face) in the input frame. This step may be similar to step 606 described above. Optionally, information representing the virtual gesture-space may be provided (e.g., so that feedback may be provided to the user 10). For simplicity, in the following description of the method 900, it is assumed that only one virtual gesture-space is generated. However, it should be understood that the method 900 may be adapted to the case where multiple virtual gesture-spaces are generated (e.g., based on multiple detected instances of the distinguishing anatomical feature in the input frame).

At 908, a hand is detected in the virtual gesture-space in the input frame (e.g., using the hand detection and tracking subsystem 316), and associated with the virtual gesture-space in which the hand was detected. This step may be similar to step 610 described above. Optionally, a primary hand may be identified and associated with the virtual gesture-space.

At 910, the virtual gesture-space is redefined based on the detected hand. Redefining the virtual gesture-space may include recalculating the location and/or dimensions of the virtual gesture-space using predefined equations related to the detected hand (instead of being related to the detected anatomical feature) in the subsequent frames to the input frame. For example, the virtual gesture-space may be redefined such that the virtual gesture-space is centered around the bounding box of the detected hand. Some example equations are described further below.

At 912, the redefined virtual gesture-space is stored. This enables the redefined virtual gesture-space (which was redefined based on the detected hand) to be used as the basis for detection and tracking of a hand in the subsequent frames to the input frame, instead of the initially generated virtual gesture-space (which was initially generated based on the detected distinguishing anatomical feature in the input frame, such as the detected face).

At 914, the hand (or primary hand) detected in the input frame is tracked in the subsequent frames to the input frame in the redefined virtual gesture-space (e.g., using the hand detected and tracking subsystem 316). This step may be similar to step 614 described above. The bounding box (and optional identifier) may be provided (e.g., to the gesture recognition subsystem 322, or other hand classifier) to analyze and parse the gesture input.

The method 900 enables the virtual gesture-space to be redefined based on the hand detected in the input frame, so that the hand may continue to be tracked and detected in each subsequent frame to the input frame even if the hand is moved farther away from the distinguishing anatomical feature. After the virtual gesture-space has been redefined based on the detected hand, the subsequent frames may be processed using the redefined virtual gesture-space.

The redefined virtual gesture-space may be continuously redefined in each subsequent frame as the hand changes location in space, such that the virtual gesture-space continues to be centered on the detected hand as the hand moves. For example, subsequent frames to the input frame in the sequence of frames may be processed using a variation of the method 900 in which steps 904 and 906 are omitted.

In some examples, if the hand is no longer detected in the redefined virtual gesture-space in a subsequent frame, the virtual gesture-space may be re-generated based on the detected distinguishing anatomical feature in the input frame. In other words, the distinguishing anatomical feature may be used as the anchor or default basis for defining the virtual gesture-space. In some examples, this reversion to using the distinguishing anatomical feature as the default basis for the virtual gesture-space may be performed only if the hand cannot be detected in the redefined virtual gesture-space for more than a predefined number of subsequent frames (e.g., at least 10 frames subsequent to the input frame).

Figure 10B:
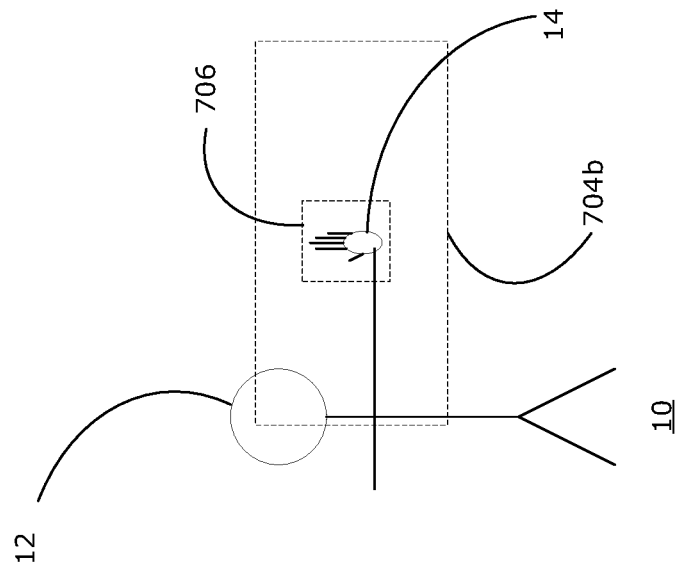
FIGS. 10A and 10B illustrate an example implementation of the method of FIG. 9.
Figure 10A:
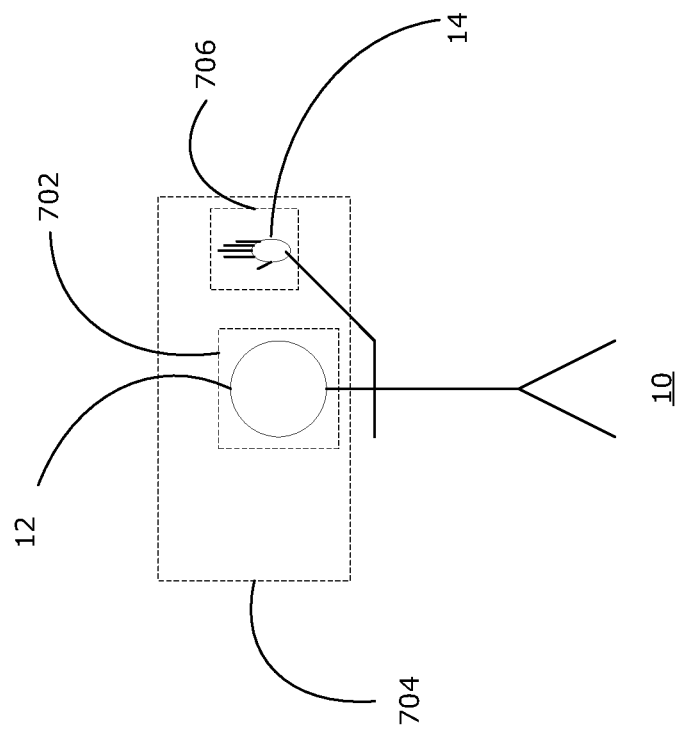

FIGS. 10A and 10B illustrate an example implementation of the method 900, in which the virtual gesture-space 704 is initially generated based on a face 12 of a user 10 detected in an input frame in a sequence of frames and is subsequently redefined based on a hand 14 of the user 10 detected in the input frame. In FIG. 10A, the virtual gesture-space 704 is a 2D space having a rectangular shape that is generated based on the bounding box 702 of the face 12 detected in the input frame (e.g., similar to the example of FIG. 7). The hand 14 is detected in the virtual gesture-space 704 in the input frame and a bounding box 706 for the hand 14 is defined. In FIG. 10B, the virtual gesture-space 704*b* is redefined based on the bounding box 706 of the hand 14.

For example, the bounding box 706 of the hand 14 may be defined by the set of values $\{x_h, y_h, w_h, h_h\}$, where $x_h$ and $y_h$ respectively define the x and y coordinates (in a frame of reference defined by the adaptive gesture-sensing system 300) of the anchor point (e.g., center) of the bounding box 706, and $w_h$ and $h_h$ respectively define the width and height of the bounding box 706. On the basis of the bounding box 706, the virtual gesture-space 704*b* is redefined (e.g., at step 910). For example, the following equations may be used to redefine the virtual gesture-space 704*b*:

$$x_g = x_h - \frac{\Delta_{xh}}{\partial_h} w_g$$

$$y_g = y_h - \frac{\Delta_{yh}}{\beta_h} h_g$$

$$w_g = \partial_h \cdot w_h$$

$$h_g = \beta_h \cdot h_h$$

where $\{x_g, y_g, w_g, h_g\}$ are parameters defining the virtual gesture-space 704*b* as discussed previously, $(\Delta_{xh}, \Delta_{yh})$ are predefined relative position parameters, and $(\partial_h, \beta_h)$ are predefined scale parameters relative to the detected hand. The parameters $(\Delta_{xh}, \Delta_{yh})$ and $(\partial_h, \beta_h)$ may be predefined (e.g., by the user 10 or by a manufacturer of the gesture-controlled device 100) according to result in a desired size of the redefined virtual gesture-space 704*b* and a desired positioning of the bounding box 706 within the redefined virtual gesture-space 704*b*. Notably, as illustrated in the example of FIG. 10B, the face 12 may be partially or entirely excluded from the redefined virtual gesture-space 704*b*.

In some examples, when multiple humans are detected in the input frame (e.g., multiple faces are detected by the face detection and tracking subsystem 312), the adaptive gesture-sensing system 300 may implement the user list 324 to rank the detected humans and identify one human as the primary user (or primary controller). The virtual gesture-space may be generated only for the primary user.

Figure 11:
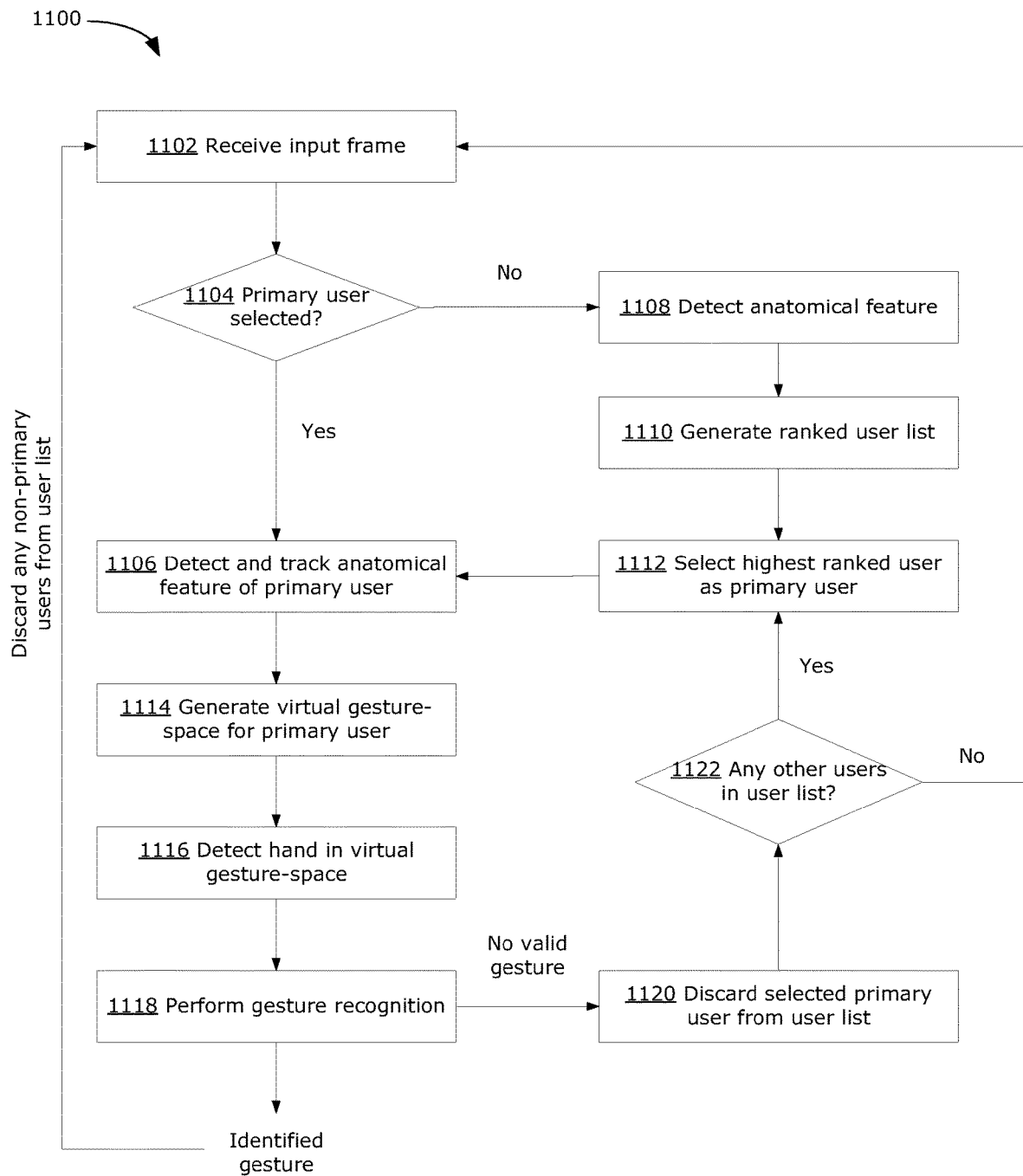
FIG. 11 is a flowchart illustrating an example method for hand detection using a virtual gesture-space, with implementation of a user list.

FIG. 11 is a flowchart illustrating an example method 1100 that may be performed by the adaptive gesture-sensing system 300, for example using the virtual gesture-space subsystem 310 and the gesture parsing subsystem 320 (and subsystems 312, 314, 316, 322, 324). Method 1100 may be carried out by routines or subroutines of software executed by processing device 202 of the gesture-controlled device 100. Coding of software for carrying out such routines or subroutines is well within the scope of a person of ordinary skill in the art having regard to the present disclosure. Method 1100 may include additional or fewer steps or actions that shown and described, and may be performed in a different order. Computer-readable code executable by for example the processing device 202 may be stored in a computer-readable medium. The method 1100 may include steps similar to those described for the method 600 above, in which case the similar steps may not be described again in detail.

At 1102, an input frame in a sequence of frames is received. This step may be similar to step 602 described above.

At 1104, it is determined whether a primary user has already been identified and selected. For example, a primary user may have been identified and selected from analyzing a previous input frame in the sequence of frames. If a primary user has already been selected, the method 1100 proceeds to step 1106; otherwise the method 1100 proceeds to step 1108.

At 1106, the distinguishing anatomical feature (e.g., face) of the primary user is detected in the input frame and tracked in subsequent frames to the input frame in the sequence of frames (e.g., using the face detection and tracking subsystem 312). If the primary user was identified in a previous input frame, a virtual gesture-space may have already been defined for the primary user. In such a case, the detection and tracking of the anatomical feature in the input frame and subsequent of frames of the input frame may be performed by processing each subsequent frame in only the already defined virtual gesture-space. Tracking of the anatomical feature is performed by processing every subsequent frame but detection may be performed at a lower frequency (e.g., skipping one or more subsequent frames). Detection of the anatomical feature may be performed to correct tracking error (e.g., tracking error may be accumulated when tracking over a number of subsequent frames). It should be noted that, although this discussion is in the context of detecting and tracking the distinguishing anatomical feature (e.g., face) of the primary user, a modification of step 1106 may be performed to process the input frame and the subsequent frames to detect and track the hand of the primary user, in the case where the virtual gesture-space is redefined based on the hand (e.g., as discussed above with respect to FIGS. 10A and 10B) detected in the input frame.

At 1108, if no primary user has been previously selected, the entire input frame may be processed to detect instances of the distinguishing anatomical feature (e.g., all instances of human faces), for example using the face detection and tracking subsystem 312. A bounding box and identifier may be generated for each detected anatomical feature. If no instances of the distinguishing anatomical feature is detected in the input frame, then the method 1100 may return to 1102 to process the next input frame in the sequence of frames.

At 1110, a ranked user list 324 is generated based on the detected instances of the anatomical feature. Each detected instance may be associated with a respective detected user. The user list 324 may be ranked by further analyzing the detected anatomical feature (e.g., using any suitable facial analysis techniques, such as any eye tracking techniques), according to predefined ranking criteria. For example, if the anatomical feature is a face, the ranking criteria may specify that larger faces (which are assumed to be closer to the gesture-controlled device 100) are ranked higher than smaller faces; faces oriented towards the gesture-controlled device 100 may be ranked higher than faces oriented away from the gesture-controlled device 100; or faces with eyes gazing at the gesture-controlled device 100 may be ranked higher than faces with eyes looking away from the gesture-controlled device 100. Other ranking criteria may be used. If there is only one instance of the distinguishing anatomical feature detected, that one instance may be ranked highest in the list by default.

At 1112, the highest ranking user in the ranked user list 324 is selected as the primary user. If there is only one user in the user list 324, then that user may be selected as the primary user by default. The method 1100 then proceeds to step 1106 to track the anatomical feature of the primary user in the sequence of frames captured by the camera 102.

At 1114, a virtual gesture-space is generated for the primary user. If the virtual gesture-space has been previously defined (based on analysis of a previous frame captured by the camera 102), the already defined virtual gesture-space may be used instead of generating the virtual gesture-space. Otherwise, the virtual gesture-space is generated based on the distinguishing anatomical feature (e.g., face) of the primary user (e.g., similar to step 606 described previously) detected in the input frame of the sequence of frames. Optionally, information representing the virtual gesture-space may be provided (e.g., so that feedback may be provided to the primary user).

At 1116, a hand is detected in the virtual gesture-space (e.g., using the hand detection and tracking subsystem 316) in the input frame in the sequence of frames. This step may be similar to step 610 described above. Optionally, if more than one hand is detected in the virtual gesture-space in the input frame, a primary hand may be identified (e.g., based on some predefined criteria, such as hand size) and associated with the virtual gesture-space. Optionally, the virtual gesture-space may be redefined based on the hand detected in the input frame (similar to that described above for FIG. 9). If the virtual gesture-space has been redefined in the subsequent frames to the input frame based on the hand detected in input frame, then detection and tracking may have already been performed at step 1106, and this step may not be needed.

At 1118, gesture recognition is performed (e.g., using the gesture recognition subsystem 322) for the hand detected (e.g., as defined by a bounding box) and tracked in the sequence of frames to the input frame to predict a gesture class for the detected hand. The predicted gesture class (if a valid gesture is identified) is outputted, to be translated to a command input for a software application for example. Any non-primary users in the user list 324 are discarded (that is, keeping only the primary user) and the method 1100 returns to 1102 to receive and process the next input frame in the sequence of frames captured by the camera 102.

If the gesture recognition fails to predict a valid gesture (e.g., the hand shape cannot be classified in any predefined gesture class), or if the gesture is not a valid gesture for the currently active software application (e.g., the software application reports an invalid input back to the adaptive gesture-sensing system 300), the method 1100 proceeds to step 1120.

At 1120, the currently selected primary user is discarded from the user list 324.

At 1122, it is determined whether there is any other user in the user list 324. If there is at least one remaining user in the user list 324, then at step 1112 the highest ranked remaining user in the user list 324 is selected as the primary user, and the method 1100 proceeds to step 1106 as described above. If there is no remaining user in the user list 324, then the method 1100 returns to step 1102 to receive and process the next input frame in the sequence of frames.

The user list 324 enables the adaptive gesture-sensing system 300 to analyze and process gesture inputs, with reduced false positives, even when there are multiple humans within the FOV 20 of the camera 102. The user list 324 may be a relatively efficient way to accommodate the presence of multiple humans, however other techniques may be used instead of or in addition to the user list 324 as discussed above.

In some examples discussed above, detection of the distinguishing anatomical feature (e.g., human face) may be performed by processing an entire input frame. In other examples, discussed below, detection of the distinguishing anatomical feature may be performed by processing only a region of interest (ROI) within an input frame. For example, at step 1108 described above, an adaptive ROI approach may be used (e.g., by the face detection and tracking subsystem 312 may implement for face detection).

An adaptive ROI, in the present disclosure, may be considered "adaptive" in the sense that the size and/or location of the ROI may be adjusted based on the requirements of the face detector (e.g., the face detection and tracking system 312, the resolution of the input frame, or processing efficiency, for example. For example, machine learning-based (e.g. computer vision based) face and hand detectors are typically trained to process a square input image. Accordingly, for improved performance in face and hand detection, the ROI for performing detection should be a square. For similar reasons, the virtual gesture-space for hand detection may be defined as a square.

Figure 12:
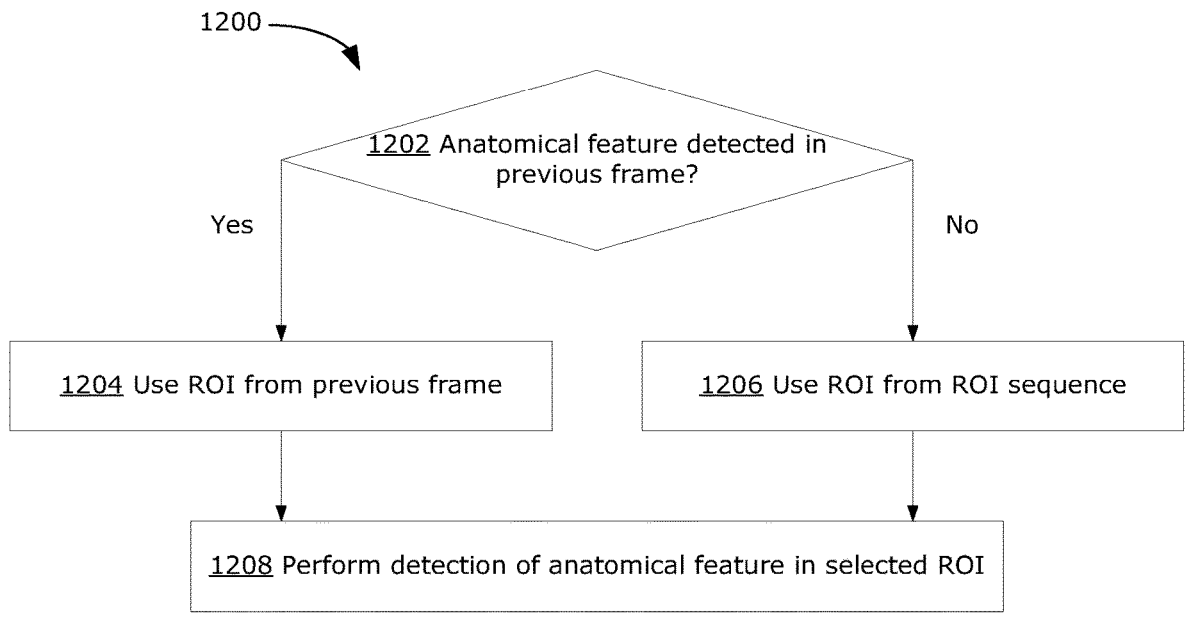
FIG. 12 is a flowchart illustrating an example method for performing detection using an adaptive ROI.

FIG. 12 is a flowchart illustrating an example method 1200 using an adaptive ROI for detecting the distinguishing anatomical feature in an input frame of a sequence of frames captured by the camera 102. The method 1200 may be used as part of the step 1108 described above. For example, the method 1200 may be implemented by the face detection and tracking subsystem 312. It should be understood that the method 1100 may be implemented using other techniques for the step 1108, and adaptive ROI may or may not be used.

At 1202, it is detected whether the anatomical feature was detected in a previous input frame. If so, then at 1204 the ROI used for detection of the anatomical feature (e.g., face) in the previous input frame is selected to be used again in the current input frame. Generally, the ROI for detection of the anatomical feature should be smaller than the entire input frame, and may be a square shape (based on how the detection algorithm was trained or designed).

If the anatomical feature was not detected in a previous input frame (or there is no previous input frame), then at 1206 a ROI is selected from a ROI sequence. If an ROI from the ROI sequence was used in the previous input frame, then the next ROI in the ROI sequence may be selected for use in the current input frame. A ROI sequence may be pre-defined (e.g., predefined in the face detection and tracking subsystem 312). The ROI sequence defines a sequence of different ROIs to be used to process sequential input frames. For example, if the ROI sequence is a sequence of eight different ROIs (e.g., having different locations and/or sizes), then each ROI in the sequence is selected in turn for performing detection of the anatomical feature in a sequence of eight input frames. The ROI sequence may then cycle back to the first ROI in the sequence.

Figure 13:
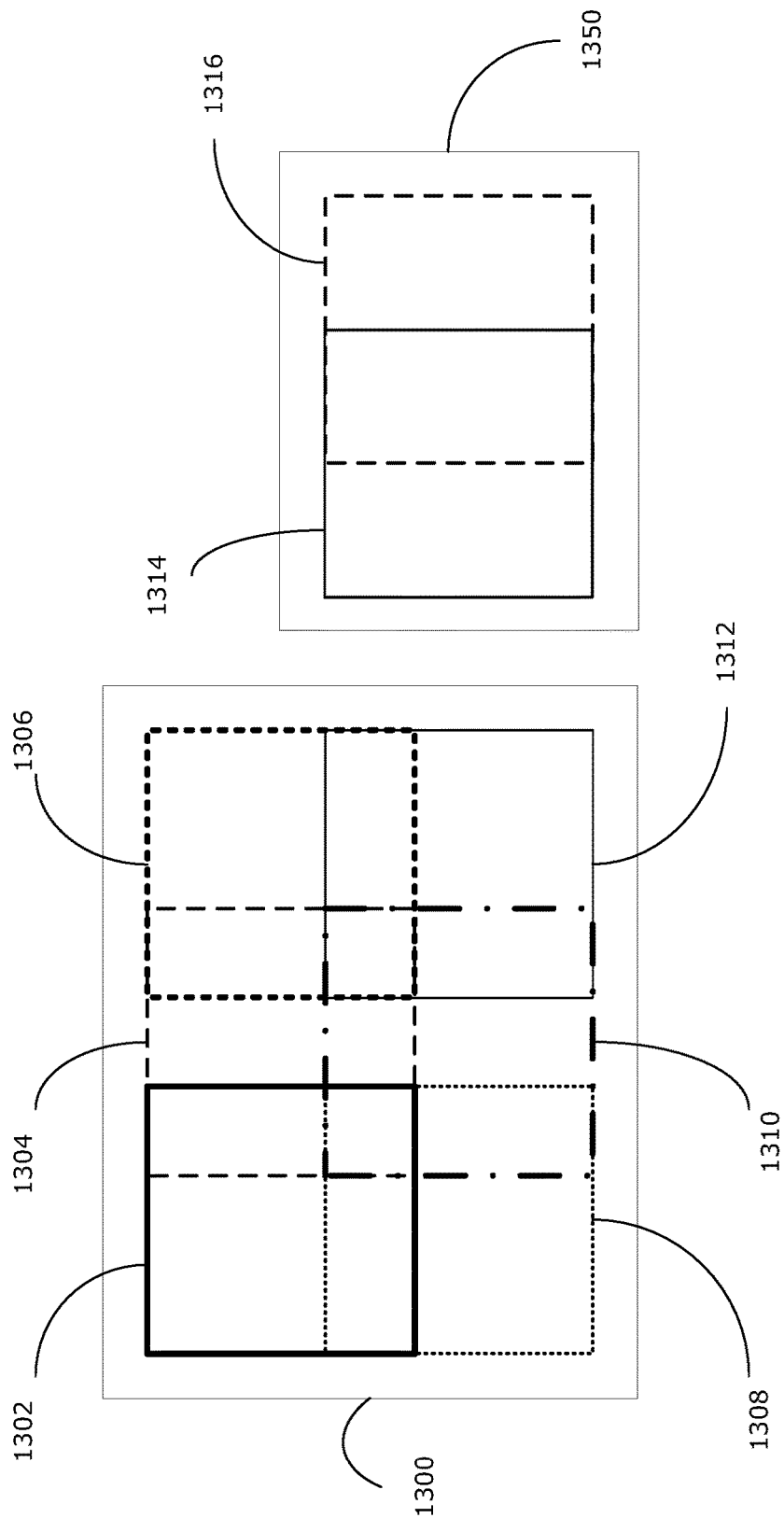
FIG. 13 shows an example ROI sequence that may be used in the method of FIG. 12.

FIG. 13 illustrates an example ROI sequence having eight different ROIs 1302, 1304, 1306, 1308, 1310, 1312, 1314, 1316. The eight ROIs 1302-1316 may be cycled through over a sequence of eight different input frames, and may be applied to input frames of different resolutions. For example, six ROIs 1302-1312 may be applied to the original resolution 1300 of the input frames, and may be designed to enable detection of smaller anatomical features (e.g., if the user 10 is farther away from the gesture-controlled device 100). Two ROIs 1314, 1316 may be applied to a downsized version 1350 of the input frames (having lower resolution), and may be designed to enable detection of larger anatomical features (e.g., if the user 10 is closer to the gesture-controlled device 100). It may be useful to use a downsized version of the input frame for some ROIs 1314, 1316 to enable less computationally expensive processing of a larger area of the input frame.

It should be noted that the sequence of ROIs is cycled over a sequence of frames captured by the camera 102, such that each input frame is processed using only one selected ROI (instead of processing the same input frame using two or more ROIs). Because input frames captured by the camera 102 are typically captured at high frequency, the time difference between adjacent frames may be small enough that there should be no (or very little) information lost by processing a sequence of frames using a sequence of ROIs in this manner.

There may be different ROI sequences that are predefined (e.g., stored in the face detection and tracking subsystem 312). The ROI sequence that is used may be chosen by the user 10, or there may be a predefined order for cycling through the different ROI sequences (i.e., there may be a predefined sequence of ROI sequences to use). Further, although the example of FIG. 13 shows each ROI in the ROI sequence being used once in the sequence, in some examples the ROI sequence may be defined to use a given ROI two or more times within the ROI sequence. Other such variations may be possible.

At 1208, the selected ROI (either the ROI that was selected in the previous input frame at step 1204, or the ROI selected from the ROI sequence at step 1206), the detection of the distinguishing anatomical feature is performed using the selected ROI.

The use of adaptive ROIs for performing detection of the distinguishing anatomical feature (e.g., face) may enable a reduction in computational cost and/or improved performance of a trained detector.

In some examples, the adaptive ROI technique may be used to process every frame that is captured by the camera 102, when gesture detection is activated (or when gesture detection is used by default). In other examples, the adaptive ROI technique may be used to process every N (where N>1) frames. As discussed previously, in some examples the hand detection and tracking subsystem 316 may output a bounding box to be used by the gesture recognition subsystem 322 for gesture recognition. In some embodiments, the gesture recognition subsystem 322 may be implemented a model that is constructed using machine learning algorithms. In some embodiments, gesture recognition subsystem 322 may include a trained neural network configured for performing gesture classification (hereinafter referred to as a trained gesture classification network). The trained gesture classification network has been trained using known machine learning algorithms to learn the parameters (e.g. weights) of the neural network. The trained gesture classification receives a bounding box for a detected hand gesture and predicts a particular gesture class from a predefined set of gesture classes that corresponds to the bounding box.

Typically, the accuracy of the gesture classification achieved by a trained neural network configured to perform gesture classification degrades as the hand image is cropped (e.g., when the bounding box has a large offset from the ground truth). An example of bounding box adjustment is described in U.S. patent application Ser No. 16/355,665, entitled "ADAPTIVE IMAGE CROPPING FOR FACE RECOGNITION", filed Mar. 15, 2019, the entirety of which is hereby incorporated by reference. A similar approach is described here for bounding box adjustment to help improve gesture recognition.

Figure 14:
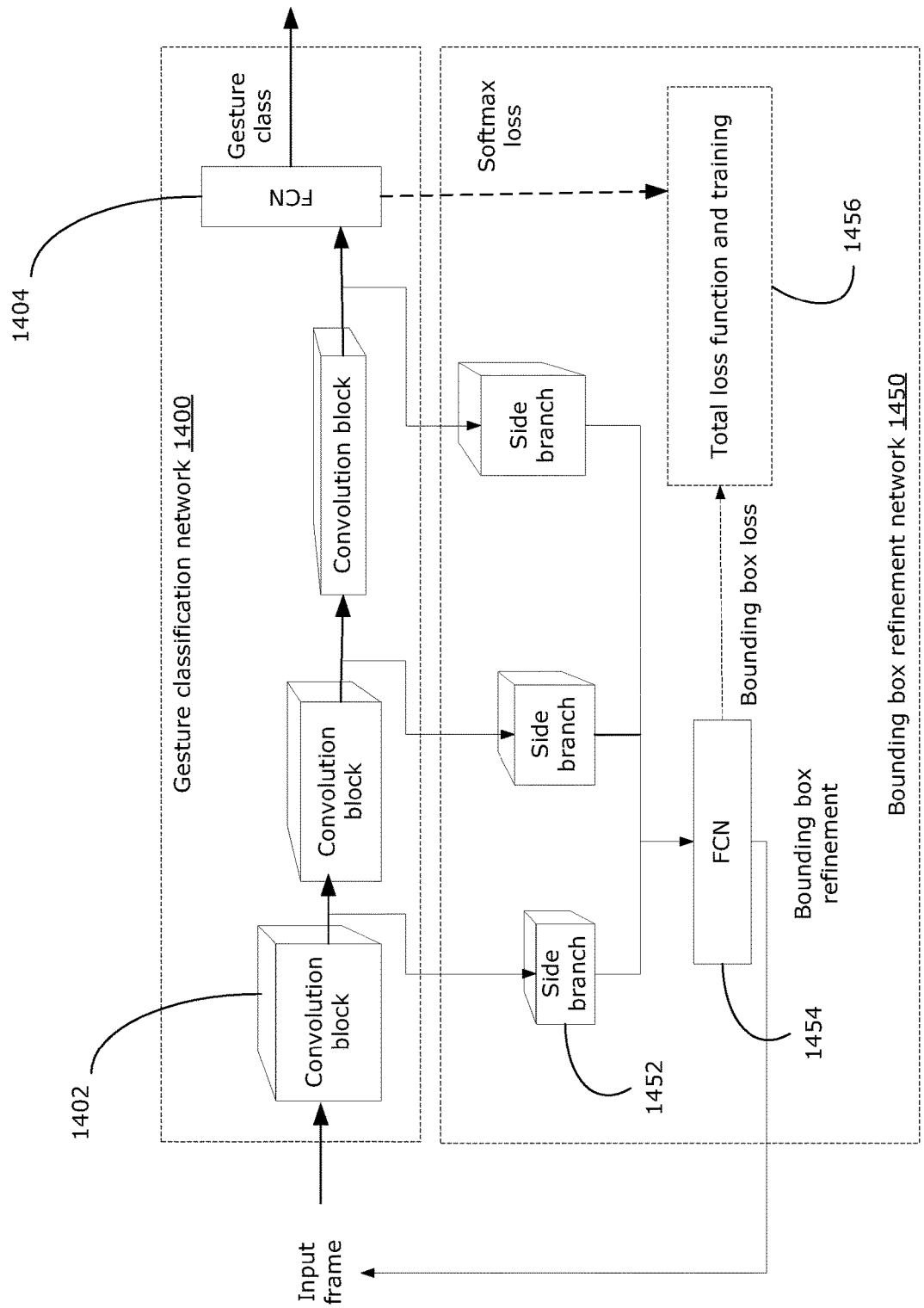
FIG. 14 is a block diagram illustrating an example joint network that may be used for gesture recognition.

FIG. 14 is a block diagram illustrating an example implementation of a gesture classification network that may be used for the gesture recognition subsystem 322. The gesture classification network 1400 may be implemented together with side branches to a bounding box refinement network 1450. The gesture classification network 1400 performs gesture classification on a hand image defined by a bounding box in an input frame, and the bounding box refinement network 1450 performs refinement of the bounding box that is used by the gesture classification network 1400.

An input frame is received as input data into the gesture classification network 1400. The input data may be a cropped version of the input frame (e.g., based on a defined bounding box for the hand). In some embodiments, the input data may be a batch of images, such as for batch-based training of the networks 1400, 1450, or to enable gesture classification based on a sequence of frames. The gesture classification network 1400 includes a series of convolutional blocks 1402 (e.g., implemented using ResNet design). Three such convolutional blocks 1402 are shown for simplicity, but there may be greater or fewer convolutional blocks 1402 in the gesture classification network 1400. The series of convolutional blocks 1402 outputs to a gesture classification fully connected network (FCN) 1404 that outputs a determined gesture class. The gesture classification FCN 1404 receives, as input, the vector output from the last convolutional block 1402 in the series of convolutional blocks 1402. The gesture classification FCN 1404 uses feature embedding to determine a gesture class for the hand defined by the bounding box, and outputs the determined gesture class as a label. In some examples, the gesture classification FCN 1404 outputs a vector that contains probability distributions for possible gesture classes. That is, the output of the gesture classification network 1400 may be probabilities for different gesture classes, instead of one definitive determined gesture class. In some examples, the gesture classification FCN 1404 includes a softmax function in the last output layer, which serves to normalize the outputted probability distributions for possible gesture classes.

Each convolution block 1402 also outputs to a side branch 1452 that belongs to the bounding box refinement network 1450. Each side branch 1452 outputs to a bounding box refinement FCN 1454. Each side branch 1452 may independently include an optional max-pooling layer, an optional resizing layer, and a convolutional block. The output of the side branches 1452 are concatenated into a combined output vector, which may be flattened by a 1×1 convolutional block (not shown) before being inputted to the bounding box refinement FCN 1454. The output of the bounding box refinement FCN 1454 is information (e.g., in the form of coordinate information for the bounding box) that adjusts or refines the size and location of the bounding box defining the hand in the input frame.

Training of the joint networks 1400, 1450 is now discussed. As described above, the gesture classification FCN 1404 may include a softmax layer. The gesture classification FCN 1404 may further calculate and output a cross-entropy loss, which may be thought of as a measure of the difference between the outputted probability distributions and the original probability distributions in the model. This cross-entropy loss may be used as a loss function for the softmax layer, and hence may also be referred to as the softmax loss. Similarly, a bounding box loss may be outputted from the bounding box refinement FCN 1454. The softmax loss and the bounding box loss may be combined for a total loss function, which may be used for training 1456 of the joint networks 1400, 1450. The softmax loss, bounding box loss and training 1456 using total loss function may be used only during training of the networks 1400, 1450, and may not be needed during inference.

During training of the networks 1400, 1450, training data samples may be generated with random cropped hand images based around a ground truth hand bounding box.

Figure 15:
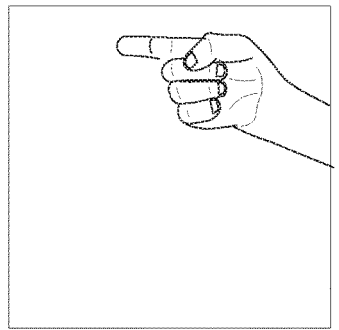
FIGS. 15 and 16 shows some example training data samples that may be used to train the joint network of FIG. 14.
Figure 15:
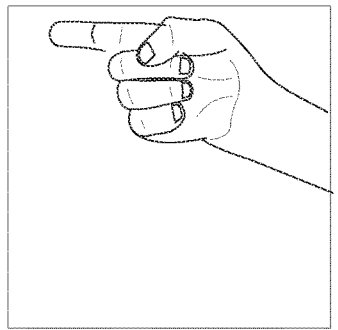
Figure 15:
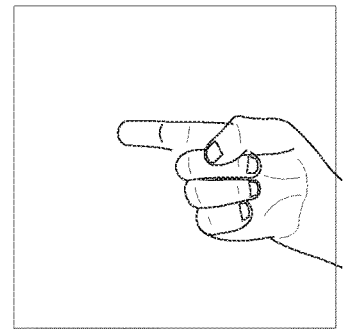
Figure 15:
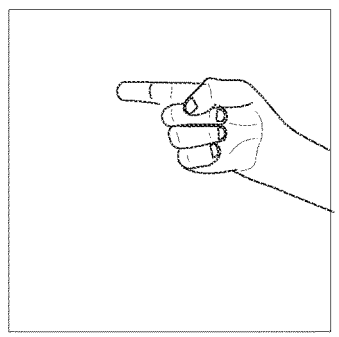
Figure 15:
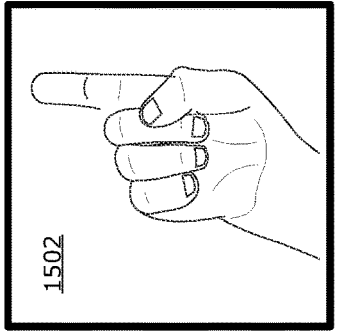
Figure 15:
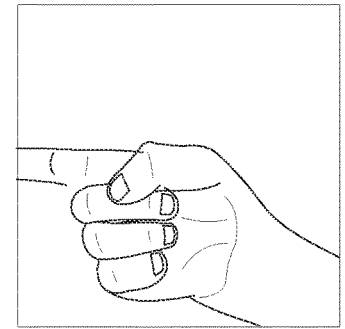
Figure 15:
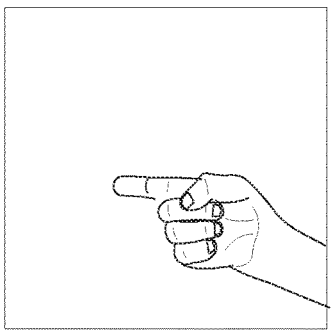
Figure 15:
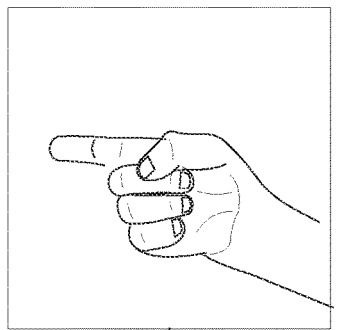
Figure 15:
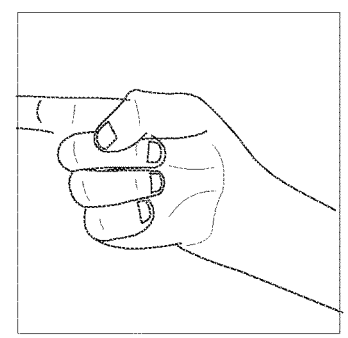

Some examples are shown in FIG. 15, in which the ground truth 1502 defines the optimized bounding box for the hand image, and other randomly cropped hand images are generated as training data samples 1504. It should be noted that the training data samples 1504 may not only shift the position of the bounding box, but may also change the size of the bounding box (such that the hand image in the bounding box may appear larger or smaller). The bounding box offset of each training data sample 1504 relative to the ground truth 1502 is used as labels for training the bounding box refinement.

The joint networks 1400, 1450 are trained by minimizing the total loss function, which in this example is a linear combination of a classification loss function (the softmax loss) and the bounding box loss function. An example of the bounding box loss function is now discussed.

Figure 16:
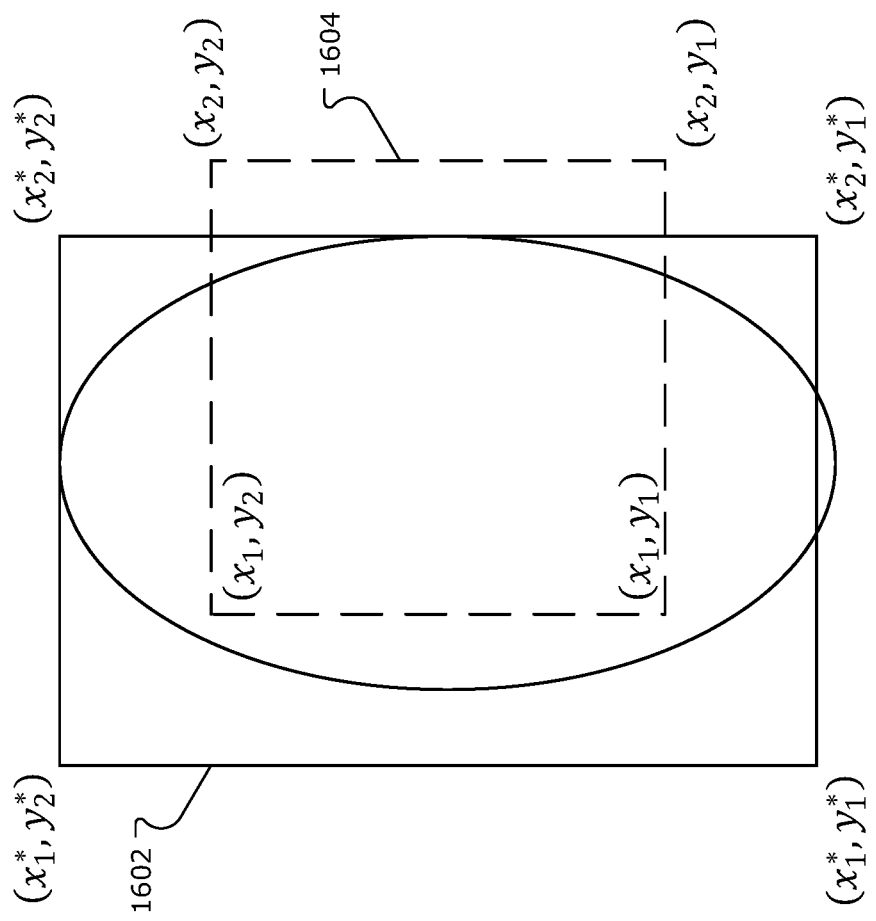

Consider the simplified example in FIG. 16, illustrating a ground truth bounding box 1602 defined around an object and a cropped training data sample bounding box 1604. Let $\{(x_1,y_1), (x_1,y_2), (x_2,y_1), (x_2,y_2)\}$ be the coordinates defining the location (in this example, the four corners) of the training data sample bounding box 1604, and let $\{(x^*_1,y^*_1), (x^*_1,y^*_2), (x^*_2,y^*_1), (x^*_2,y^*_2)\}$ be the coordinates defining the location of the corresponding ground truth 1602 bounding box. The bounding box refinement network 1450 estimates the relative rotation $\theta$ and the relative displacement $\{z_1,z_2,z_3,z_4\}$ between the training data sample bounding box 1604 and the ground truth bounding box 1602, where:

$$z_1 = \frac{x^*_1 - x_1}{x_2 - x_1}, z_2 = \frac{x^*_2 - x_2}{x_2 - x_1}, z_3 = \frac{y^*_1 - y_1}{y_2 - y_1}, z_4 = \frac{y^*_2 - y_2}{y_2 - y_1}$$

The bounding box loss function can be defined as:

$$L_{bc} = \lambda \left(\frac{\theta}{\pi}\right)^2 + \frac{1}{4}\sum_{k=1}^{4} (f_k - z_k)^2$$

where $\lambda$ is a regularization parameter.

During inference, the bounding box defining a hand image in an input frame can be iteratively corrected until the offset predicted by the bounding box refinement network 1450 is close to zero. The final gesture classification score can be computed by combining all the individual gesture classification scores obtained at each iteration as follows:

$$\bar{s} = \sum_{m=1}^{M} \partial_m \cdot s_m$$

where $s_m$ is the classification score (e.g., softmax output) of the m-th iteration, and $\partial_m$ its corresponding weight (e.g. intersection over union (IoU)) of the m-th bounding box and the final refined bounding box.

During inference, an iterative classification is applied to an input hand image (defined by a bounding box applied to the input frame) using the gesture classification network 1400. In each iteration, the input image to the gesture classification network 1400 is obtained based on the previous input image corrected by the outputted bounding box refinement parameters of the previous iteration.

Thus, the bounding box refinement network 1450 and the gesture classification network 1400 operate together to provide feedback for refining the bounding box defining the hand image in the input frame, in order to help improve the performance of the gesture classification network 1400.

Figure 17:
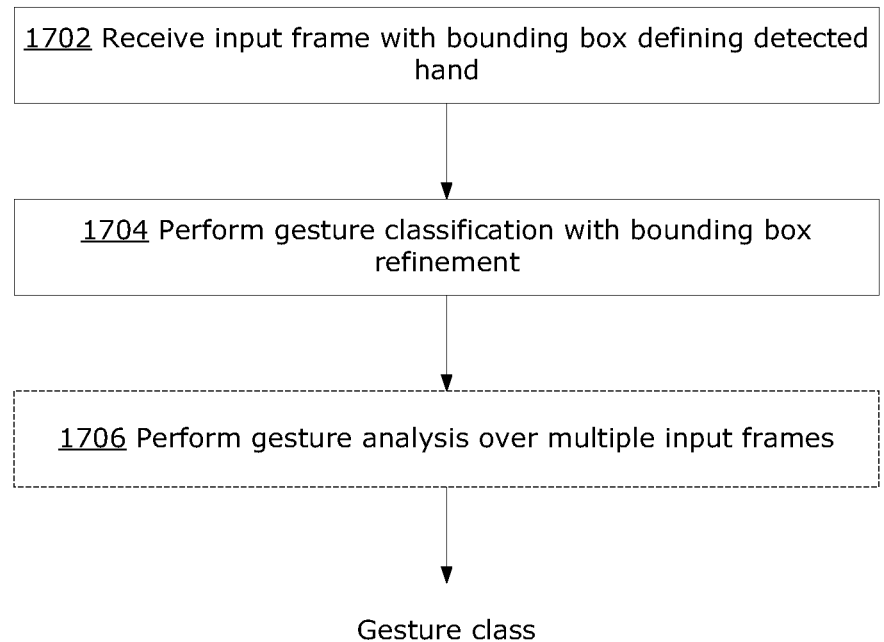
FIG. 17 is a flowchart illustrating an example method for gesture recognition.

FIG. 17 is a flowchart illustrating an example method 1700 using bounding box refinement (e.g., using the joint networks 1400, 1450 described above) for performing gesture recognition. The method 1700 may be used as part of the step 1118 described above. For example, the method 1700 may be implemented by the gesture recognition subsystem 322. It should be understood that the method 1100 may be implemented using other techniques for the step 1118, and bounding box refinement may or may not be used.

At 1702, the input frame is received as well as a bounding box defining the detected hand (e.g., outputted by the hand detection and tracking subsystem 316).

At 1704, the gesture classification network with joint bounding box refinement network (as described above) may be used to perform gesture classification with bounding box refinement.

Optionally, at 1706, gesture analysis may be performed over multiple input frames. For example, the gesture recognition subsystem 322 may store a buffer of previous input frames and perform gesture analysis by considering the previous input frames.

A buffer (e.g., implemented in the adaptive gesture-sensing system 300) may be used to store a predetermined number of previous input frames. The number of previous input frames that are stored in the buffer may be relatively small (e.g., 10-30 previous input frames), for more efficient use of memory resources. In some examples, the buffer may additionally or alternatively store the results of the gesture analysis performed on the small number of previous input frames.

For a single static gesture to be recognized, the gesture recognition subsystem 322 may require that the same gesture class be detected a predefined minimum number of times (K) over a predefined number of previous input frames (N), where K≥1 and K≤N. This requirement may help to improve detection accuracy and reduce false positives. In some examples, the same gesture class may need to be detected over K consecutive input frames over N previous input frames. The predefined minimum K may be selected to be a relatively small number (e.g., 10) to enable better detection and still achieve near real-time gesture recognition. Static gestures that may be detected using this approach may include, for example, the mute gesture (e.g., for mute or unmute commands) or the open hand gesture (e.g., for play or pause commands). The N previous input frames may be stored in the buffer, and may be used as a sliding window for detecting gestures, to help reduce false positives.

A dynamic gesture may be recognized by the gesture recognition subsystem 322 based on a combination of two or more static gestures. For example, a complete dynamic gesture may be decoupled into different states, where transition between states is the result of detection of a static gesture. The gesture recognition subsystem 322 may implement a set of predefined state transition rules, for state-based recognition of dynamic gestures.

Figure 18:
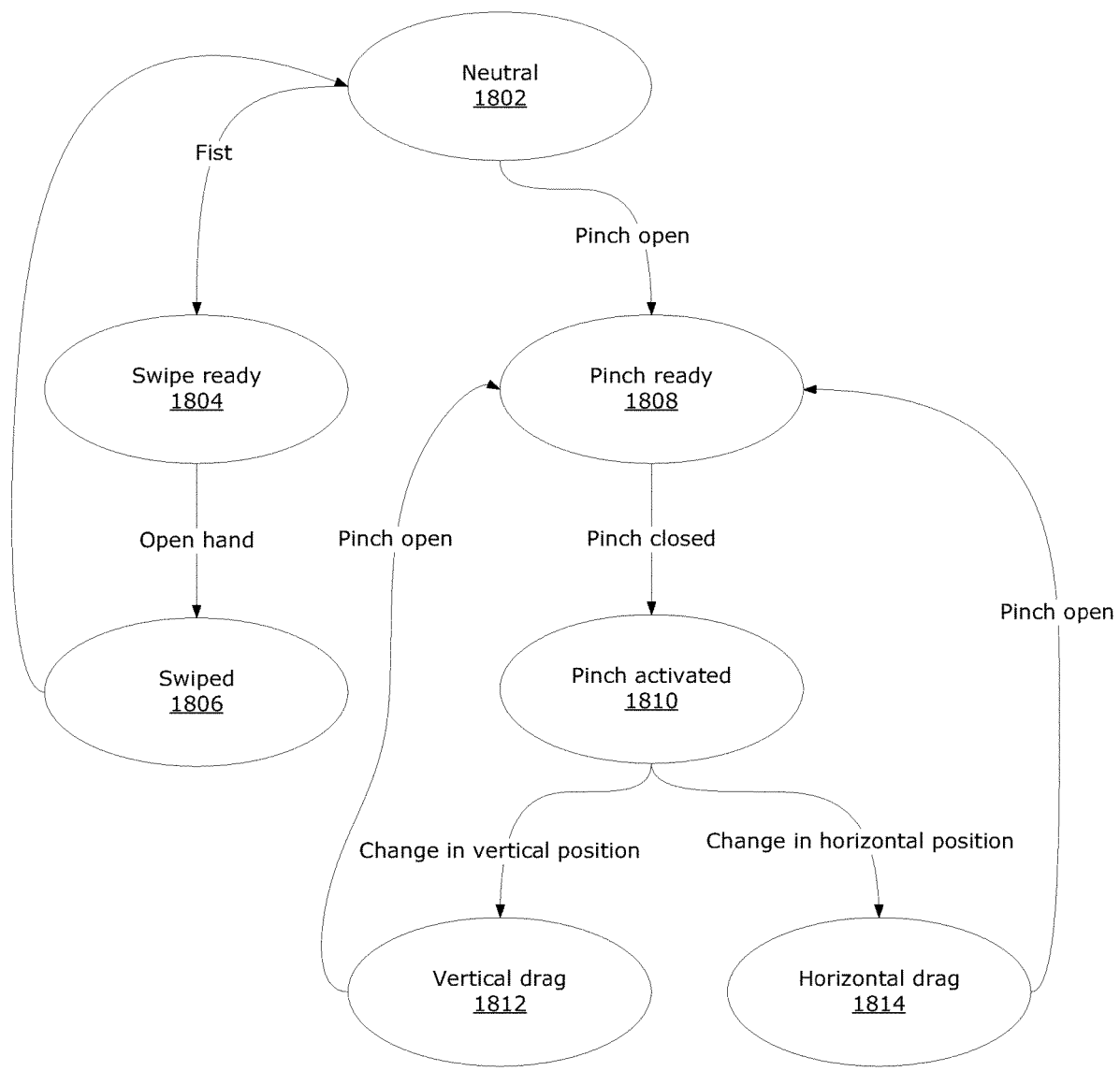
FIG. 18 is a state diagram illustrating an example of state-based gesture recognition.

FIG. 18 is a state diagram illustrating an example of state-based recognition of dynamic gestures, which may be implemented by the gesture recognition subsystem 322. The neutral state 1802 may be initial state by default when gesture input is first activated, or when a current valid gesture is not detected.

A swipe dynamic gesture may be detected when a fist gesture is first detected to transition to the swipe ready state 1804, followed by detection of an open hand gesture to transition to the swiped state 1806. Upon reaching the swiped state 1806, the gesture recognition subsystem 322 recognizes the gesture input as a dynamic swipe gesture. Thus, the recognition of the static fist gesture followed by the static open hand gesture (in proper order) results in the recognition of the dynamic swipe gesture. Further, a change in location between the detected fist gesture and the detected open hand gesture may be required to positively detect a dynamic swipe gesture (e.g., in order to distinguish the swipe gesture from another dynamic gesture that does not involve a change in location). A change in location of a detected gesture may be calculated based on a change in the coordinates of the hand bounding box. Upon reaching the swiped state 1806, the gesture recognition subsystem 322 may generate an output indicating the recognized gesture (e.g., gesture class label) and may further provide output indicating the change in location between the detection of the swipe ready state 1804 and the swiped state 1806.

A vertical or horizontal dynamic drag gesture may be detected as a combination of pinch open, pinch closed and pinch open static gestures. For example, from the neutral state 1802, a transition to a pinch ready state 1808 occurs after detection of the pinch open static gesture. From the pinch ready state 1808, detection of the pinch closed static gesture causes a transition to the pinch activated state 1810. From the pinch activated state 1810 and staying in the pinch closed static gesture, a change in vertical location (e.g., a change that is greater than a predefined threshold) causes a transition to the vertical drag state 1812. Similarly, from the pinch activated state 1810 and staying in the pinch closed static gesture, a change in horizontal location (e.g., a change that is greater than a predefined threshold) causes a transition to the horizontal drag state 1814). If the change in location is a combination of vertical and horizontal changes (e.g., a diagonal change in location), the change that is greater in magnitude may be used for determining the state transition. Alternatively, if the change in location is a combination of vertical and horizontal changes, there may not be a state transition recognized. Upon reaching the vertical drag state 1812 or the horizontal drag state 1814, the gesture recognition subsystem 322 may generate an output indicating the recognized gesture (e.g., gesture class label) and may further provide output indicating the change in vertical or horizontal location. For example, the gesture recognition subsystem 322 may calculate the distance (e.g., based on coordinates defined in the input frame) and output this value. The distance value may be used to map the dynamic drag gesture to a drag command input. From the vertical drag state 1812 or the horizontal drag state 1814, detection of the pinch open static gesture causes a transition to the pinch ready state 1808. Return to the pinch ready state 1808 may be recognized as the end of the dynamic drag gesture.

For dynamic gestures that involve a change in location, the gesture recognition subsystem 322 may implement predefined rules based on laws of physics and/or expected human motion, to further exclude possible false positives. For example, a predefined rule may be that a detected hand should not exhibit a change in location that is greater than a predefined threshold (e.g., a change of more than 100 pixels) between consecutive input frames.

Using state-based gesture recognition may be advantageous over motion-based gesture segmentation and recognition. For example, significantly higher processing resources may be required to detect and process gesture motion, compared to detecting static gestures. Further, state-based gesture recognition may be less prone to false positives.

In some examples, the present disclosure describes an method for hand detection in an input frame in sequence of frames captured by a camera 102 that includes performing image adjustment to help improve image quality. In general, gesture recognition performance tends to degrades in low-light scenarios. For example, if the gesture-controlled device 100 is a smart TV being viewed in a dark room, the screen of the smart TV may be the only significant lighting source when the sequence of frames are captured by the camera 102 of the gesture-controlled device 100. In the invention, we propose three methods to solve the problem. Some example techniques for image adjustment are described below, each of which may be implemented by the hand detection and tracking subsystem 316, for example, and which may be used in combination.

Figure 19:
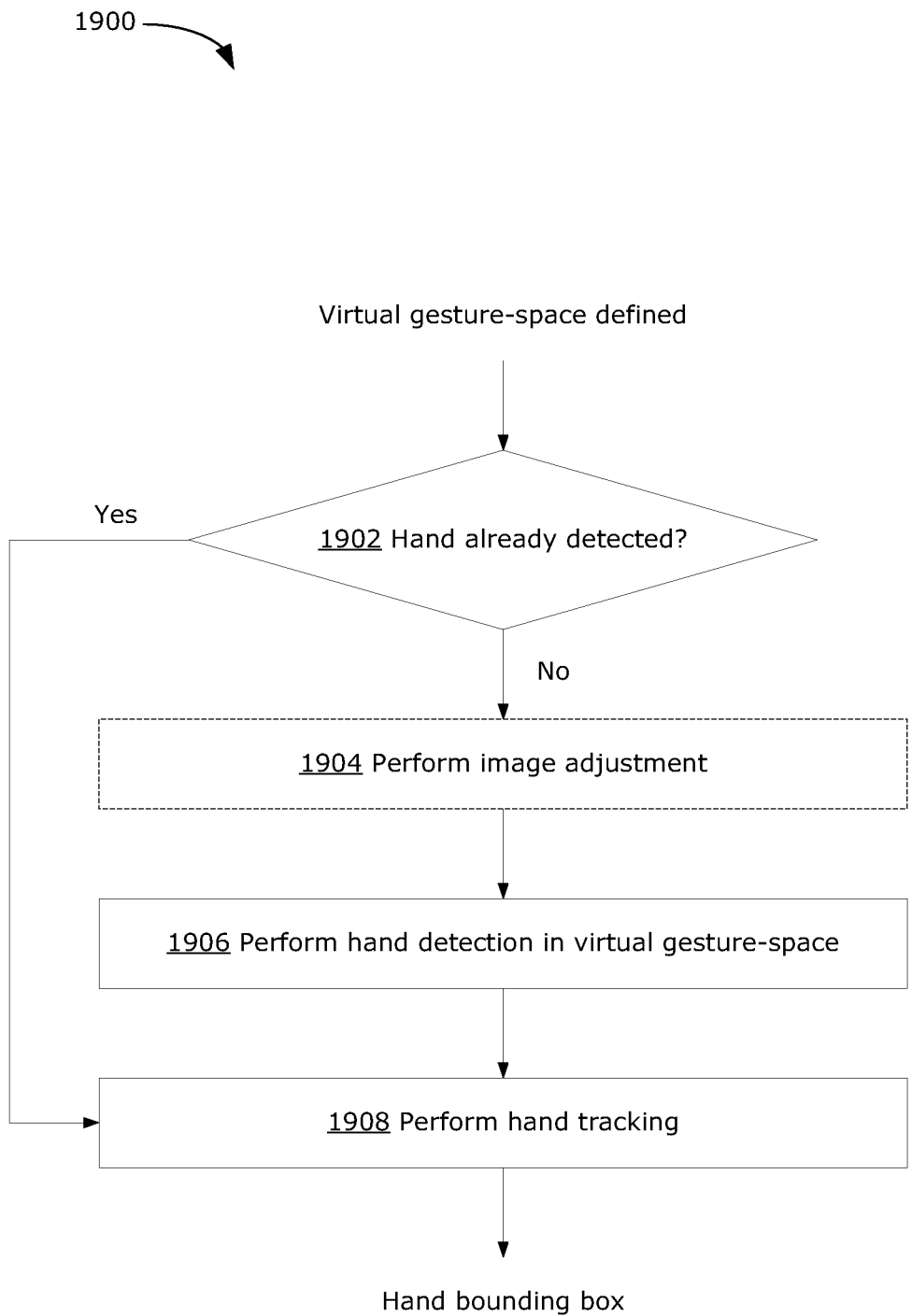
FIG. 19 is a flowchart illustrating an example method for hand detection, including image adjustment.

FIG. 19 is a flowchart illustrating an example method 1900 for performing hand detection and tracking, including performing image adjustment in a sequence of frames captured by a camera 102. The method 1900 may be used as part of the step 1116 described above. For example, the method 1900 may be implemented by the hand detection and tracking subsystem 316. It should be understood that the method 1100 may be implemented using other techniques for the step 1116, and image adjustment as described below may or may not be used.

The method 1900 starts after the virtual gesture-space has been defined (e.g., by the virtual gesture-space generation subsystem 314, at step 1114).

At 1902, it is determined whether a hand has already been detected in a previous input frame in a sequence of frame captured by the camera 102. If a hand was already detected, then the method 1900 may proceed to step 1908. For example, if a hand was already successfully detected in a previous input frame, then the bounding box that was generated from the successful detection of a hand in a previous input frame may be used as the starting point for tracking the hand in a current input frame in the sequence of frames (e.g., based on the assumption that the time between consecutive frames is short enough that the hand would still be at least partly within the previous bounding box). Further, if the hand was successfully detected in a previous input frame in the sequence of frames, it may be considered that illumination in the environment is sufficient (e.g., based on the assumption that light levels in the environment should not change significantly in the short time between consecutive frames) and image adjustment is not required.

If a hand was not already detected in a previous input frame in the sequence of frames captured by the camera 102, then the method 1900 proceeds to step 1904.

Optionally, at 1904, image adjustment is performed. In some examples, image adjustment may be performed only if it is determined that image adjustment is needed. For example, a light sensor of the gesture-controlled device 100 may be used to detect ambient light levels and determine if light levels are low enough to require image adjustment. In some examples, an analysis of at least a portion of the input image (e.g., over the entire input image, over only the virtual gesture-space, or over only the hand bounding box) may be performed (e.g., determining overall pixel intensity levels) to determine if image adjustment is required.

In some examples, image adjustment may be performed by default, without first determining whether image adjustment is needed. In such a case, performing image adjustment (e.g., gamma correction) may result in little or no change to the image if the image is already sufficiently illuminated.

Various techniques may be used for image adjustment, particularly to correct for low-light conditions.

In some examples, image adjustment may include adjusting illumination of an image, using a face detected in a previous frame in a sequence of frames as reference (in the case where a human face is the distinguishing anatomical feature). Assuming that a face has been detected in a previous frame (e.g., using the face detection and tracking subsystem 312), the detected face may be used as a reference to perform illumination adjustment on the input frame.

Let $(\bar{x},\sigma_x)$ and $(\bar{y},\sigma_y)$ denote the predefined (e.g., determined empirically via calibration, or pre-coded) means and standard deviations of pixel intensity for a face image captured in low-light and under preferred illumination conditions, respectively.

Figure 20:
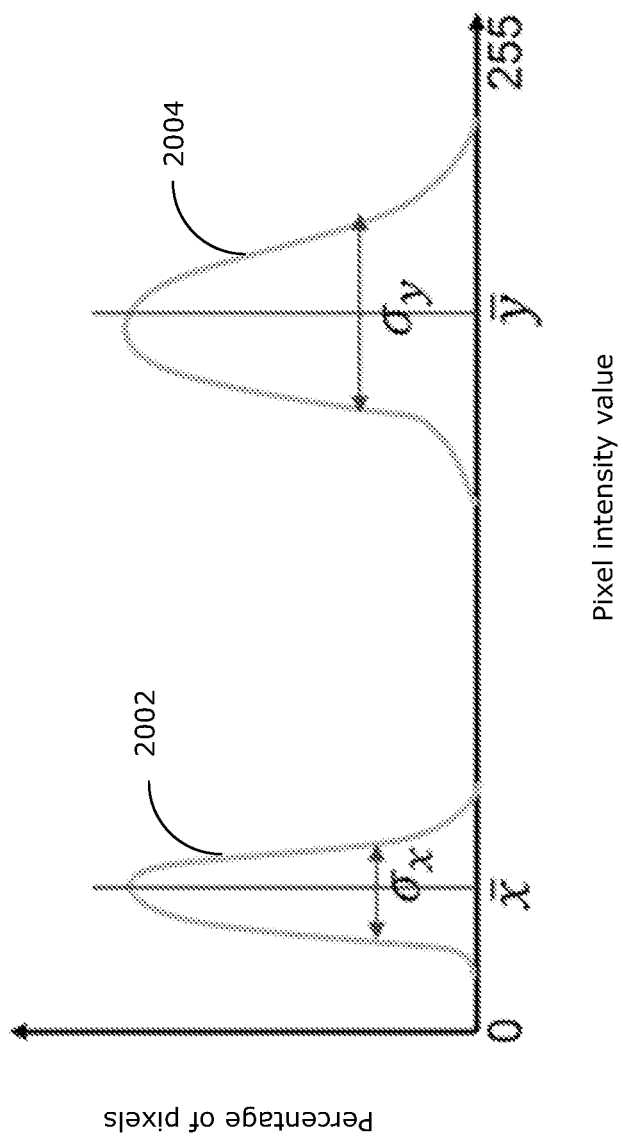
FIG. 20 is a graph illustrating an example of image adjustment based on pixel intensity.

FIG. 20 is a graph that illustrate a representative histogram 2002 of pixel intensity values when an image that includes a face is captured in low-light, and a representative histogram 2004 of pixel intensity values when an image that includes a face is captured in preferred illumination conditions.

A mapping from the low-light pixels to the preferred illumination pixels can be calculated using the equation:

$$y_i = \bar{y} + \frac{\sigma_y}{\sigma_x}(x_i - \bar{x})$$

Using this equation, all the pixels $x_i$ within the virtual gesture-space defined in the input frame may be transformed to adjusted pixels $y_i$ by using the above mapping formula for better hand detection. Although the above description discusses illumination adjustment to correct a low-light condition, it should be understood that a similar illumination adjustment may be used to correct an overly-bright condition.

In some examples, image adjustment may include performing gamma correction (which may be considered form of illumination correction). Various gamma correction techniques may be used. For example, let $x_i$ be a pixel value of a single channel of the input frame. Then, a gamma transformation may be calculated by:

$$y_i = \left(\frac{x_i}{255}\right)^\gamma$$

where $y_i$ is the adjusted pixel value and $y$ is the standard parameter of a gamma transformation.

In some examples, image adjustment may include changing the display of the gesture-controlled device 100. This approach may be useful in situations where the screen of the gesture-controlled device 100 is a source of illumination in the environment (e.g., the gesture-controlled device 100 is a television, smartphone or tablet). In such an approach, a low-light condition may first be detected using any suitable technique. For example, a low-light condition may be detected using a light sensor that may be part of the gesture-controlled device 100. A low-light condition may also be detected by analyzing the pixel intensity of the input frame, and if the majority of the pixels fall below a predefined intensity threshold then a low-light condition may be determined.

After a low-light condition is detected, the display content and/or brightness of the screen of the gesture-controlled device 100 may be controlled such that the screen becomes a stronger light source to capture better quality images. Output from the adaptive gesture-sensing system 300 may be communicated to indicate that the input frame has been analyzed to have poor illumination, and the processing device 202 may control the display 104 to change the display content and/or brightness of the screen accordingly. In some examples, where detection of the low-light condition is not based on image analysis (e.g., using a light sensor of the gesture-controlled device 100), the processing device 202 may control the display 104 accordingly without any information from the adaptive gesture-sensing system 300.

In some examples, controlling the display content and/or brightness in this way may be performed after a low-light condition is detected and after a gesture input has been initiated (e.g., the user 10 has manually provided input to activate gesture-based command inputs, or a recognized hand gesture has been initially detected). In some examples, the screen of the gesture-controlled device 100 may be controlled to change the screen background lighting to be brighter. In some examples, the screen of the gesture-controlled device 100 may be controlled to add an illumination section to the displayed content. The illumination section may be a brighter section (e.g., all white section) of the display.

Figure 21B:
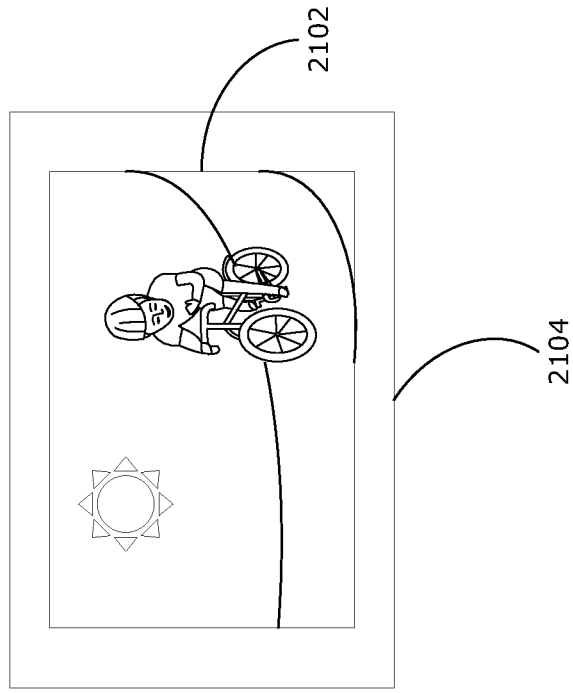
FIGS. 21A and 21B illustrate an example of image adjustment that includes adding an illumination section to displayed content.
Figure 21A:
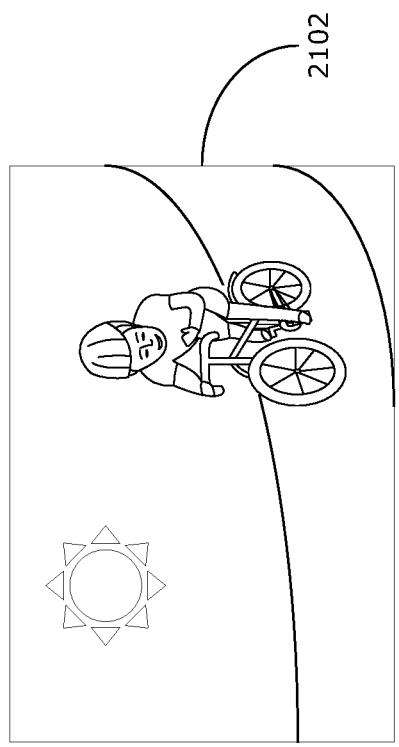

For example, FIG. 21A shows a regular image 2102 that may be displayed under regular light conditions, or when gesture input has not been initiated on a display 104 of a gesture-controlled device, such as a television or a smartphone. After a low-light condition is detected and gesture input is initiated, the displayed content may be adjusted to that of FIG. 21B. In FIG. 21B, the image 2102 has been reduced in size and an illumination section 2104 has been added. In this example, the illumination section 2104 is a border along all four sides of the display. In other section, the illumination section 2104 may be along only one side, two sides, or three sides, or may include discontinuous sections along one or more sides of the display. The brightness, hue and/or size (e.g., thickness and length) of the illumination section 2104 may be automatically adjusted based on the detected low-light condition. For example, there may be different levels of low-lighting at predefined thresholds (e.g., based on detected pixel intensity, or based on output from a light sensor), and different parameters for the illumination section 2104 may be predefined at the different low-lighting levels. Generally, lower-lighting levels may require a larger and/or brighter illumination section 2104.

Returning to FIG. 19, at 1906, hand detection is performed in the virtual gesture-space (e.g., using the hand detection and tracking subsystem 316). The hand detection and tracking subsystem 316 may include a trained neural network may be used configured for detecting a hand in the image 2104, as discussed above. Successful hand detection by the hand detection and tracking subsystem 316 using a trained neural network may output a bounding box defined for a hand detected in the virtual gesture-space.

At 1908, hand tracking is performed using the hand detection and tracking subsystem 316, based on the bounding box defined for the detected hand. The bounding box may be updated based on the tracking.

Information from the hand detection and tracking (e.g., a defined bounding box for the hand) may then be provided for gesture recognition (e.g., by the gesture recognition subsystem 322).

In various examples, the present disclosure describes systems and methods to help improve accuracy and efficiency for detecting and recognizing gesture inputs. The present disclosure may be useful for detecting and recognizing gesture inputs in a complex environment and/or for long-distance detection of gestures.

Using one or more of the methods described above (e.g., the adaptive ROI technique, the bounding box refinement joint network, the virtual gesture-space, the image adjustment, the state-based gesture recognition) may enable more robust detection and recognition of gesture input, even in complex real-life scenarios. The improved accuracy of gesture detection may enable more efficient processing of captured input frames. In some examples, input frames may be processed at a frequency that is lower than the rate of image capture. For example, instead of processing every input frame, every N (where N>1) frames is processed for face (or other distinguishing anatomical feature) and hand detection and tracking. N may be a parameter that is user-selected, may be preprogrammed, or may be automatically selected by the gesture-controlled device 100 (e.g., N may be 1 when images are captured at a rate below a predefined threshold; N may be 2 or higher when images are captured above the predefined threshold; N may be 1 when image quality is poor or low resolution; N may be 2 or higher when image resolution is high). By processing every N (N>1) frames, gesture detection and recognition may still be performed with good accuracy at near real-time, and the processing resources required from the gesture-controlled device may be decreased.

The present disclosure describes example implementations using neural networks for face and hand detection. An example joint neural network is described that enable refinement of a hand bounding box, to help improve accuracy of gesture classification and recognition.

In some examples, a virtual gesture-space is described, which may be defined based on a detected human face (or other distinguishing anatomical feature). By using the defined virtual gesture-space for detection of a hand, more accurate and/or efficient detection of hand gestures may be achieved. In some examples, the virtual gesture-space may be further defined with subspaces where gesture inputs to a particular subspace may be mapped to mouse inputs. Thus, the virtual gesture-space may be used as a virtual mouse.

Although examples have been described in the context of a gesture-controlled device having a display and a camera (such as a smart TV, a smartphone or a tablet), the present disclosure may be relevant to other gesture-controlled devices that may or may not include a display and/or camera. For example, the present disclosure may be relevant to smart speakers, smart appliances, Internet of things (IoT) devices, dashboard devcies (e.g., installed in a vehicle) or devices having low computational resource.

Examples described herein may be applicable to artificial reality (AR), virtual reality (VR) and/or video gaming applications.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   processing an input frame of a sequence of frames captured by a camera of a device to determine a location of at least one detected instance of a distinguishing anatomical feature in the input frame, the at least one detected instance of the distinguishing anatomical feature detected in the input frame being a non-hand anatomical feature;
   defining, for at least a selected one of the at least one detected instance of the distinguishing anatomical feature, a virtual gesture-space based on the location of the selected one instance of the distinguishing anatomical feature, the virtual gesture-space being a shape defined within the input frame for detecting a gesture input;
   processing only the virtual gesture-space that is the shape defined within each frame in the sequence of frames to detect and track at least one hand;
   predicting, using information generated from detecting and tracking the at least one hand, a gesture class associated with the at least one hand; and
   outputting the predicted gesture class associated with the at least one hand.

2. The method of claim 1, wherein the distinguishing anatomical feature is a human face.

3. The method of claim 1, wherein there is a plurality of detected instances of the distinguishing anatomical feature, one virtual gesture-space is defined for each respective detected instance, and each virtual gesture-space is processed to perform hand detection and tracking.

4. The method of claim 1, further comprising:
   after the virtual gesture-space has been defined, processing at least one subsequent input frame by performing hand detection and tracking in only the defined virtual gesture-space without further performing detection of the distinguishing anatomical feature in the at least one subsequent input frame.

5. The method of claim 1, further comprising:
using information generated from detecting and tracking the at least one hand, redefining the virtual gesture-space based on a detected location of the at least one hand.

6. The method of claim 5, further comprising:
after the virtual gesture-space has been redefined based on the detected location of the at least one hand, processing at least one subsequent input frame by performing hand detection and tracking only in the redefined virtual gesture-space without further performing detection of the distinguishing anatomical feature in the at least one subsequent input frame.

7. The method of claim 1, wherein the information generated from detecting and tracking the at least one hand includes a bounding box defining the at least one hand in the input frame, and wherein gesture classification is performed using the bounding box.

8. The method of claim 1, further comprising:
defining one or more subspaces in the virtual gesture-space;
wherein information generated from detecting and tracking the at least one hand includes information indicating the at least one hand is detected in one of the one or more subspaces; and
wherein each subspace is associated with a respective mouse input.

9. The method of claim 1, wherein the virtual gesture-space is a 3D shape.

10. An apparatus comprising:
a processing device coupled to a memory storing machine-executable instructions thereon, wherein the instructions, when executed by the processing device, cause the apparatus to:
process an input frame of a sequence of frames to determine a location of at least one detected instance of a distinguishing anatomical feature in the input frame, the at least one detected instance of the distinguishing anatomical feature detected in the input frame being a non-hand anatomical feature;
define, for at least a selected one of the at least one detected instance of the distinguishing anatomical feature, a virtual gesture-space based on the location of the selected one instance of the distinguishing anatomical feature, the virtual gesture-space being a shape defined within the input frame for detecting a gesture input;
process only the virtual gesture-space that is the shape defined within each frame in the sequence of frames to detect and track at least one hand;
predict, using information generated from detecting and tracking the at least one hand, a gesture class associated with the at least one hand; and
output the predicted gesture class associated with the at least one hand.

11. The apparatus of claim 10, wherein the distinguishing anatomical feature is a human face.

12. The apparatus of claim 10, wherein there is a plurality of detected instances of the distinguishing anatomical feature, one virtual gesture-space is defined for each respective detected instance, and each virtual gesture-space is processed to perform hand detection and tracking.

13. The apparatus of claim 10, wherein the instructions further cause the apparatus to:
after the virtual gesture-space has been defined, process at least one subsequent input frame by performing hand detection and tracking only in the defined virtual gesture-space without further performing detection of the distinguishing anatomical feature in the at least one subsequent input frame.

14. The apparatus of claim 10, wherein the instructions further cause the apparatus to:
using information generated from detecting and tracking the at least one hand, redefine the virtual gesture-space based on a detected location of the at least one hand.

15. The apparatus of claim 14, wherein the instructions further cause the apparatus to:
after the virtual gesture-space has been redefined based on the detected location of the at least one hand, process at least one subsequent input frame by performing hand detection and tracking only in the redefined virtual gesture-space without further performing detection of the distinguishing anatomical feature in the at least one subsequent input frame.

16. The apparatus of claim 10, wherein the information generated from detecting and tracking the at least one hand includes a bounding box defining the at least one hand in the input frame, and wherein gesture classification is performed using the bounding box.

17. The apparatus of claim 10, wherein the instructions further cause the apparatus to:
define one or more subspaces in the virtual gesture-space;
wherein information generated from detecting and tracking the at least one hand includes information indicating the at least one hand is detected in one of the one or more subspaces; and
wherein each subspace is associated with a respective mouse input.

18. The apparatus of claim 10, wherein the apparatus is a gesture-controlled device, and wherein the determined gesture class is used to determine a command input to the gesture-controlled device.

19. The apparatus of claim 18, further comprising a camera for capturing the sequence of frames including the input frame, and the gesture-controlled device is one of: a television, a smartphone, a tablet, a vehicle-coupled device, an internet of things device, an artificial reality device, or a virtual reality device.

20. A non-transitory computer-readable medium having machine-executable instructions stored thereon, the instructions, when executed by a processing device of an apparatus, cause the apparatus to:
process an input frame of a sequence of frames to determine a location of at least one detected instance of a distinguishing anatomical feature in the input frame, the at least one detected instance of the distinguishing anatomical feature detected in the input frame being a non-hand anatomical feature;
define, for at least a selected one of the at least one detected instance of the distinguishing anatomical feature, a virtual gesture-space based on the location of the selected one instance of the distinguishing anatomical feature, the virtual gesture-space being a shape defined within the input frame for detecting a gesture input;
process only the virtual gesture-space that is the shape defined within each frame in the sequence of frames to detect and track at least one hand;
predict, using information generated from detecting and tracking the at least one hand, a gesture class associated with the at least one hand; and output the predicted gesture class associated with the at least one hand.

* * * * *